United States Patent
Hannuksela et al.

(10) Patent No.: US 12,113,974 B2
(45) Date of Patent: Oct. 8, 2024

(54) HIGH-LEVEL SYNTAX FOR SIGNALING NEURAL NETWORKS WITHIN A MEDIA BITSTREAM

(71) Applicant: Nokia Technologies Oy, Espoo (FI)

(72) Inventors: Miska Matias Hannuksela, Tampere (FI); Emre Baris Aksu, Tampere (FI); Francesco Cricrì, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/934,734

(22) Filed: Sep. 23, 2022

(65) Prior Publication Data

US 2023/0112309 A1    Apr. 13, 2023

Related U.S. Application Data

(60) Provisional application No. 63/261,843, filed on Sep. 30, 2021.

(51) Int. Cl.
*H04N 19/117* (2014.01)
*H04N 19/184* (2014.01)
*H04N 19/70* (2014.01)
*H04N 19/85* (2014.01)

(52) U.S. Cl.
CPC ......... *H04N 19/117* (2014.11); *H04N 19/184* (2014.11); *H04N 19/70* (2014.11); *H04N 19/85* (2014.11)

(58) Field of Classification Search
CPC .... H04N 19/117; H04N 19/184; H04N 19/70; H04N 19/85
See application file for complete search history.

(56) References Cited

U.S. PATENT DOCUMENTS

| | | | |
|---|---|---|---|
| 10,645,404 B2* | 5/2020 | Wang | H04N 19/60 |
| 2015/0271528 A1* | 9/2015 | Wang | H04N 19/60 |
| | | | 375/240.26 |
| 2020/0304836 A1 | 9/2020 | Li et al. | |

FOREIGN PATENT DOCUMENTS

WO    2022/167977 A1    8/2022

OTHER PUBLICATIONS

"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.

(Continued)

*Primary Examiner* — Jae N Noh
(74) *Attorney, Agent, or Firm* — Harrington & Smith

(57) ABSTRACT

A method, an apparatus, and a computer program product are provided. An example method includes defining an enhancement message comprising at least one of the following: an identifying number for identifying a post-processing filter; a mode identity (idc) field used of indicating association of a post-processing filter with the identifying number; a flag for specifying the enhancement message being used for a current layer; and the payload byte comprising a bitstream; and using the enhancement message for at least one of specifying a neural network that is used as a post-processing filter or cancelling a use of a previous post-processing filter with the same identifying number.

20 Claims, 17 Drawing Sheets

(56) References Cited

OTHER PUBLICATIONS

"Versatile Video Coding", Series H: Audiovisual and Multimedia Systems Infrastructure of audiovisual services—Coding of moving video, Recommendation ITU-T H.266, Aug. 2020, 516 pages.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.
"Information technology—Universal coded character set (UCS)", ISO/IEC 10646, Sixth edition, Dec. 2020, 9 pages.
"IEEE 802.11", Wikipedia, Retrieved on Oct. 12, 2022, Webpage available at : https://en.wikipedia.org/wiki/IEEE_802.11.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end Packet-switched Streaming Service (PSS); Protocols and codecs (Release 16)", 3GPP TS 26.234, V16.2.0, Dec. 2020, pp. 1-173.
"Information Technology—Dynamic Adaptive Streaming over HTTP (DASH)—Part 1: Media Presentation Description and Segment Formats", ISO/IEC 23009-1, Second Edition, May 15, 2014, 152 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.5.0, Sep. 2021, pp. 1-140.
Schulzrinne et al., "RTP: A Transport Protocol for Real-Time Applications", RFC 3550, Network Working Group, Jul. 2003, pp. 1-104.
Schulzrinne et al., "RTP Profile for Audio and Video Conferences with Minimal Control", RFC 3551, Network Working Group, Jul. 2003, pp. 1-44.
Ott et al., "Extended RTP Profile for Real-time Transport Control Protocol (RTCP) Based Feedback (RTP/AVPF)", RFC 4585, Network Working Group, Jul. 2006, pp. 1-51.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
Wang et al., "RTP Payload Format for H.264 Video", RFC 6184, Internet Engineering Task Force (IETF), May 2011, pp. 1-101.
Wang et al., "RTP Payload Format for High Efficiency Video Coding (HEVC)", RFC 7798, Internet Engineering Task Force (IETF), Mar. 2016, pp. 1-86.
Josefsson, "The Base16, Base32, and Base64 Data Encodings", RFC 4648, Network Working Group, Oct. 2006, pp. 1-18.
"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Information technology—Coded Representation of Immersive Media—Part 5: Video-based Point Cloud Compression", ISO/IEC JTC 1/SC 29/WG 11, ISO/IEC 23090-5, 2019, 102 pages.
Extended European Search Report received for corresponding European Patent Application No. 22198588.0, dated Mar. 2, 2023, 12 pages.
Hannuksela et al., "AHG9: On post-filter SEI", Nokia, Joint Video Experts Team (JVET) of ITU-T SG 16 WP 3 and ISO/IEC JTC 1/SC29, JVET-V0058, 22nd Meeting, Apr. 20-28, 2021, 4 pages.
Wang et al., "SEI manifest and prefix indication SEI messages", Qualcomm Incorporated, Joint Collaborative Team on Video Coding (JCT-VC) of ITU-T SG 16 WP 3 and ISO/IEC JTC 1/SC 29/WG 11, JCTVC-AB0025, 28th Meeting, Jul. 15-21, 2017, pp. 1-8.
Chujoh et al., "AHG9/AHG11 Level information for super-resolution neural network", Sharp corporation, Joint Video Experts Team (JVET) of ITU-T SG 16 WP 3 and ISO/IEC JTC 1/SC29, JVET-U0053-v1, 21st Meeting, Jan. 6-15, 2021, 6 pages.

* cited by examiner

HIGH-LEVEL SYNTAX FOR SIGNALING NEURAL NETWORKS WITHIN A MEDIA BITSTREAM

TECHNICAL FIELD

The examples and non-limiting embodiments relate generally to multimedia transport and neural networks, and more particularly, to high-level syntax for signaling neural networks within a media bitstream.

BACKGROUND

It is known to provide standardized formats for exchange of neural networks.

SUMMARY

An example method includes: defining an enhancement message comprising at least one of the following: an identifying number for identifying a post-processing filter; a mode identity (idc) field used of indicating association of a post-processing filter with the identifying number; a flag for specifying the enhancement message being used for a current layer; and the payload byte comprising a bitstream; and using the enhancement message for at least one of specifying a neural network that is used as a post-processing filter or cancelling a use of a previous post-processing filter with the same identifying number.

The example method may further include, wherein values of identifying number from 0 to $2^{20}-1$, inclusive, are be used as determined by an application, and wherein values of identifying number from $2^{20}$ to $2^{21}-1$, inclusive, are reserved for future use.

The example method may further include, wherein the identifying number comprises a neural network post-filter identity (nnrpf_id).

The example method may further include, wherein: the mode idc field with a value of '0' specifies that no post-processing filter associated with the identifying number as specified in the enhancement message; the mode idc field with a value of '1' specifies that the post-processing filter associated with the identifying number is a neural network identified by a given uniform resource identifier (URI); the mode idc field with a value of '2' specifies that the post-processing filter associated with the identifying number is a neural network represented by the bitstream contained in the enhancement message; and/or the mode idc field with a value of '3' specifies that the post-processing filter is the neural network identified by a previous enhancement message, in decoding order, with the identifying number value equal to '1' or '2' and updated by the bitstream contained in the enhancement message.

The example method may further include, wherein: the flag with value of '0' specifies that the enhancement message applies to a current decoded picture; and/or the flag with value of '1' specifies that the enhancement message applies to the current decoded picture and subsequent decoded pictures of a current layer in output order.

The example method may further include, wherein the enhancement message is applied to the subsequent decoded picture until one or more of the following conditions are met: a new coded layer video sequence (CLVS) of the current layer begins; the bitstream end; the enhancement message comprises mode idc with values equal to '1' or '2' and Aa picture that follows the current picture in output order and is associated with a first enhancement message with the same identifying number value as that in the enhancement message and the mode idc values equal to 0, 1, or 2 is output; or the enhancement message comprises mode idc with equal to 3 and a picture that follows the current picture in output order is associated with a second enhancement message with the same identifying number as that the enhancement message and any mode idc value is output.

The example method may further include, wherein the enhancement message further comprises a universal resource identifier (URI) field comprising a URI identifying the neural network used as the post-processing filter.

The example method may further include, wherein the enhancement message comprises a neural network representation (NNR) post-filter supplemental enhancement information (SEI) message.

The example method may further include, wherein the bitstream comprises a bitstream conforming to ISO/IEC 15938-17.

Another example method includes defining an enhancement message comprising the following: an identifying number used to identify a post-processing filter; and a purpose field for indicating a purpose of post-processing filter identified the identifying number; and using the enhancement message for specifying the purpose of a post-filter.

The example method may further include, wherein values of identifying number from 0 to $2^{20}-1$, inclusive, are be used as determined by an application, and wherein values of identifying number from $2^{20}$ to $2^{21}-1$, inclusive, are reserved for future use.

The example method may further include, wherein the purpose comprises at least one of visual quality improvement of a media item or increase the width or height of cropped decoded output media item.

The example method may further include, wherein the enhancement message further includes a width field for specifying a width of the luma sample array of the media item resulting by applying the post-processing filter, identified by the identifying number, to a cropped decoded output media item; and a height field for specifying a height of the luma sample array of the media item resulting by applying the post-processing filter, identified by the identifying number, to a cropped decoded output media item.

The example method may further include, wherein: the enhancement message comprises a post-filter purpose supplemental enhancement information message; the identifying number comprises post-filter purpose identity (pfp_id); the purpose field comprises post-filter purpose (pfp_purpose); the width field comprises a post-filter purpose picture width in luma samples (pfp_pic_width_in_luma_samples); and/or the height field comprises a post-filter purpose picture height in luma samples (pfp_pic_height_in_luma_samples).

An example apparatus includes at least one processor; and at least one non-transitory memory comprising computer program code; wherein the at least one memory and the computer program code are configured to, with the at least one processor, cause the apparatus at least to perform: define an enhancement message comprising at least one of the following: an identifying number for identifying a post-processing filter; a mode identity (idc) field used of indicating association of a post-processing filter with the identifying number; a flag for specifying the enhancement message being used for a current layer; and the payload byte comprising a bitstream; and use the enhancement message for at least one of specifying a neural network that is used as a post-processing filter or cancelling a use of a previous post-processing filter with the same identifying number.

The example apparatus may further include, wherein values of identifying number from 0 to $2^{20}-1$, inclusive, are be used as determined by an application, and wherein values of identifying number from $2^{20}$ to $2^{21}-1$, inclusive, are reserved for future use.

The example apparatus may further include, wherein the identifying number comprises a neural network post-filter identity (nnrpf_id).

The example apparatus may further include, wherein: the mode idc field with a value of '0' specifies that no post-processing filter associated with the identifying number as specified in the enhancement message; the mode idc field with a value of '1' specifies that the post-processing filter associated with the identifying number is a neural network identified by a given uniform resource identifier (URI); the mode idc field with a value of '2' specifies that the post-processing filter associated with the identifying number is a neural network represented by the bitstream contained in the enhancement message; and/or the mode idc field with a value of '3' specifies that the post-processing filter is the neural network identified by a previous enhancement message, in decoding order, with the identifying number value equal to '1' or '2' and updated by the bitstream contained in the enhancement message.

The example apparatus may further include, wherein: the flag with value of '0' specifies that the enhancement message applies to a current decoded picture; and/or the flag with value of '1' specifies that the enhancement message applies to the current decoded picture and subsequent decoded pictures of a current layer in output order.

The example apparatus may further include, wherein the enhancement message is applied to the subsequent decoded picture until one or more of the following conditions are met: a new coded layer video sequence of the current layer begins; the bitstream end; the enhancement message comprises mode idc with values equal to '1' or '2' and Aa picture that follows the current picture in output order and is associated with a first enhancement message with the same identifying number value as that in the enhancement message and the mode idc values equal to 0, 1, or 2 is output; or the enhancement message comprises mode idc with equal to 3 and a picture that follows the current picture in output order is associated with a second enhancement message with the same identifying number as that the enhancement message and any mode idc value is output.

The example apparatus may further include, wherein the enhancement message further comprises a universal resource identifier (URI) field comprising a URI identifying the neural network used as the post-processing filter.

The example apparatus may further include, wherein the enhancement message comprises a neural network representation (NNR) post-filter supplemental enhancement information (SEI) message.

The example apparatus may further include, wherein the bitstream comprises a bitstream conforming to ISO/IEC 15938-17.

Another example apparatus includes at least one processor; and at least one non-transitory memory comprising computer program code; wherein the at least one memory and the computer program code are configured to, with the at least one processor, cause the apparatus at least to perform: define an enhancement message comprising the following: an identifying number used to identify a post-processing filter; and a purpose field for indicating a purpose of post-processing filter identified the identifying number; and use the enhancement message for specifying the purpose of a post-filter.

The example apparatus may further include, wherein values of identifying number from 0 to $2^{20}-1$, inclusive, are be used as determined by an application, and wherein values of identifying number from $2^{20}$ to $2^{21}-1$, inclusive, are reserved for future use.

The example apparatus may further include, wherein the purpose comprises at least one of visual quality improvement of a media item or increase the width or height of cropped decoded output media item.

The example apparatus may further include, wherein the enhancement message further comprises: width field for specifying a width of the luma sample array of the media item resulting by applying the post-processing filter, identified by the identifying number, to a cropped decoded output media item; and height field for specifying a height of the luma sample array of the media item resulting by applying the post-processing filter, identified by the identifying number, to a cropped decoded output media item.

The example apparatus may further include, wherein: the enhancement message comprises a post-filter purpose supplemental enhancement information message; a identifying number comprises a post-filter purpose identity (pfp_id); the purpose field comprises a post-filter purpose (pfp_purpose); the width field comprises a post-filter purpose picture width in luma samples (pfp_pic_width_in_luma_samples); and/or a height field comprises a post-filter purpose picture height in luma samples (pfp_pic_height_in_luma_samples).

An example computer readable medium includes program instructions for causing an apparatus to perform at least the following: define an enhancement message including at least one of the following: an identifying number for identifying a post-processing filter; a mode identity (idc) field used of indicating association of a post-processing filter with the identifying number; a flag for specifying the enhancement message being used for a current layer; and the payload byte comprising a bitstream; and use the enhancement message for at least one of specifying a neural network that is used as a post-processing filter or cancelling a use of a previous post-processing filter with the same identifying number.

The example computer readable medium may further include, wherein the apparatus is further caused to perform the methods as claimed in any of the previous paragraphs.

The example computer readable medium may further include, wherein the computer readable medium comprises a non-transitory computer readable medium.

Another example computer readable medium includes program instructions for causing an apparatus to perform at least the following: define an enhancement message comprising the following: an identifying number used to identify a post-processing filter; and a purpose field for indicating a purpose of post-processing filter identified the identifying number; and use the enhancement message for specifying the purpose of a post-filter.

The example computer readable medium may further include, wherein the apparatus is further caused to perform the methods as claimed in any of the previous paragraphs.

The example computer readable medium may further include, wherein the computer readable medium comprises a non-transitory computer readable medium.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 2:
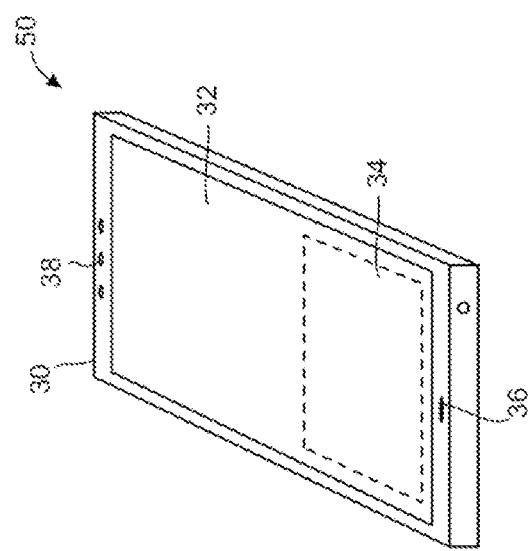
FIG. 2 shows schematically a user equipment suitable for employing embodiments of the examples described herein.

The following acronyms and abbreviations that may be found in the specification and/or the drawing figures are defined as follows:

| | |
|---|---|
| 3GP | 3GPP file format |
| 3GPP | 3rd Generation Partnership Project |

-continued

| | |
|---|---|
| 3GPP TS | 3GPP technical specification |
| 4CC | four character code |
| 4G | fourth generation of broadband cellular network technology |
| 5G | fifth generation cellular network technology |
| 5GC | 5G core network |
| ACC | accuracy |
| AI | artificial intelligence |
| AIoT | AI-enabled IoT |
| ALF | adaptive loop filtering |
| a.k.a. | also known as |
| AMF | access and mobility management function |
| APS | adaptation parameter set |
| AVC | advanced video coding |
| bpp | bits-per-pixel |
| CABAC | context-adaptive binary arithmetic coding |
| CDMA | code-division multiple access |
| CE | core experiment |
| $c_i$ | structure index |
| Ctu | coding tree unit |
| CU | central unit |
| DASH | dynamic adaptive streaming over HTTP |
| DCT | discrete cosine transform |
| DSP | digital signal processor |
| DU | distributed unit |
| eNB (or eNodeB) | evolved Node B (for example, an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, for example, the LTE radio access technology |
| FDMA | frequency division multiple access |
| f(n) | fixed-pattern bit string using n bits written (from left to right) with the left bit first. |
| F1 or F1-C | interface between CU and DU control interface |
| gNB (or gNodeB) | base station for 5G/NR, for example, a node providing NR user plane and control plane protocol terminations towards the UE, and connected via the NG interface to the 5GC |
| GSM | Global System for Mobile communications |
| H.222.0 | MPEG-2 Systems is formally known as ISO/IEC 13818-1 and as ITU-T Rec. H.222.0 |
| H.26x | family of video coding standards in the domain of the ITU-T |
| HLS | high level syntax |
| IBC | intra block copy |
| ID | identifier |
| IEC | International Electrotechnical Commission |
| IEEE | Institute of Electrical and Electronics Engineers |
| I/F | interface |
| IMD | integrated messaging device |
| IMS | instant messaging service |
| IoT | internet of things |
| IP | internet protocol |
| IRAP | intra random access point |
| ISO | International Organization for Standardization |
| ISOBMFF | ISO base media file format |
| ITU | International Telecommunication Union |
| ITU-T | ITU Telecommunication Standardization Sector |
| JPEG | joint photographic experts group |
| LMCS | luma mapping with chroma scaling |
| LPA | length of position array |
| LTE | long-term evolution |
| LZMA | Lempel-Ziv-Markov chain compression |
| LZMA2 | simple container format that can include both uncompressed data and LZMA data |
| LZO | Lempel-Ziv-Oberhumer compression |
| LZW | Lempel-Ziv-Welch compression |
| MAC | medium access control |
| mdat | MediaDataBox |
| MME | mobility management entity |
| MMS | multimedia messaging service |
| moov | MovieBox |
| MP4 | file format for MPEG-4 Part 14 files |
| MPEG | moving picture experts group |
| MPEG-2 | H.222/H.262 as defined by the ITU |

-continued

| | |
|---|---|
| MPEG-4 | audio and video coding standard for ISO/IEC 14496 |
| MSB | most significant bit |
| NAL | network abstraction layer |
| NDU | NN compressed data unit |
| ng or NG | new generation |
| ng-eNB or NG-eNB | new generation eNB |
| NN | neural network |
| NNEF | neural network exchange format |
| NNR | neural network representation |
| NR | new radio (5G radio) |
| N/W or NW | network |
| ONNX | Open Neural Network eXchange |
| PB | protocol buffers |
| PC | personal computer |
| PDA | personal digital assistant |
| PDCP | packet data convergence protocol |
| PHY | physical layer |
| PID | packet identifier |
| PLC | power line communication |
| PNG | portable network graphics |
| PSNR | peak signal-to-noise ratio |
| RAM | random access memory |
| RAN | radio access network |
| RBSP | raw byte sequence payload |
| $RC_i$ | structural tensor |
| RD loss | rate distortion loss |
| RFC | request for comments |
| RFID | radio frequency identification |
| RLC | radio link control |
| RRC | radio resource control |
| RRH | remote radio head |
| $RT_i$ | topology element tensor respectively |
| RU | radio unit |
| Rx | receiver |
| SDAP | service data adaptation protocol |
| SGD | Stochastic Gradient Descent |
| SGW | serving gateway |
| SMF | session management function |
| SMS | short messaging service |
| SPS | sequence parameter set |
| st(v) | null-terminated string encoded as UTF-8 characters as specified in ISO/IEC 10646 |
| SVC | scalable video coding |
| S1 | interface between eNodeBs and the EPC |
| TCP-IP | transmission control protocol-internet protocol |
| TDMA | time divisional multiple access |
| Trak | TrackBox |
| TS | transport stream |
| TUC | technology under consideration |
| TV | television |
| Tx | transmitter |
| UE | user equipment |
| ue(v) | unsigned integer Exp-Golomb-coded syntax element with the left bit first |
| UICC | Universal Integrated Circuit Card |
| UMTS | Universal Mobile Telecommunications System |
| u(n) | unsigned integer using n bits |
| UPF | user plane function |
| URI | uniform resource identifier |
| URL | uniform resource locator |
| UTF-8 | 8-bit Unicode Transformation Format |
| VPS | video parameter set |
| WLAN | wireless local area network |
| X2 | interconnecting interface between two eNodeBs in LTE network |
| Xn | interface between two NG-RAN nodes |

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with an example embodiment in order to provide signaling neural networks for a media bitstream.

Figure 1:
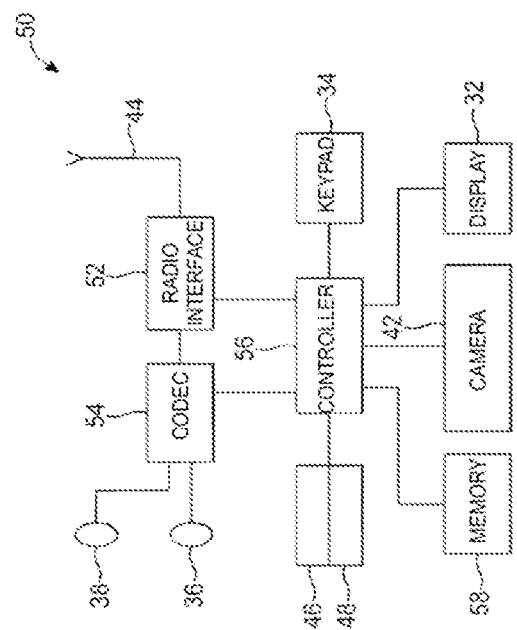
FIG. 1 shows schematically an electronic device employing embodiments of the examples described herein.

The following describes in detail suitable apparatus and possible mechanisms for signaling neural networks within an encoded media bitstream according to embodiments. In this regard reference is first made to FIG. 1 and FIG. 2, where FIG. 1 shows an example block diagram of an apparatus 50. The apparatus may be an Internet of Things (IOT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display media or multimedia content, for example, an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
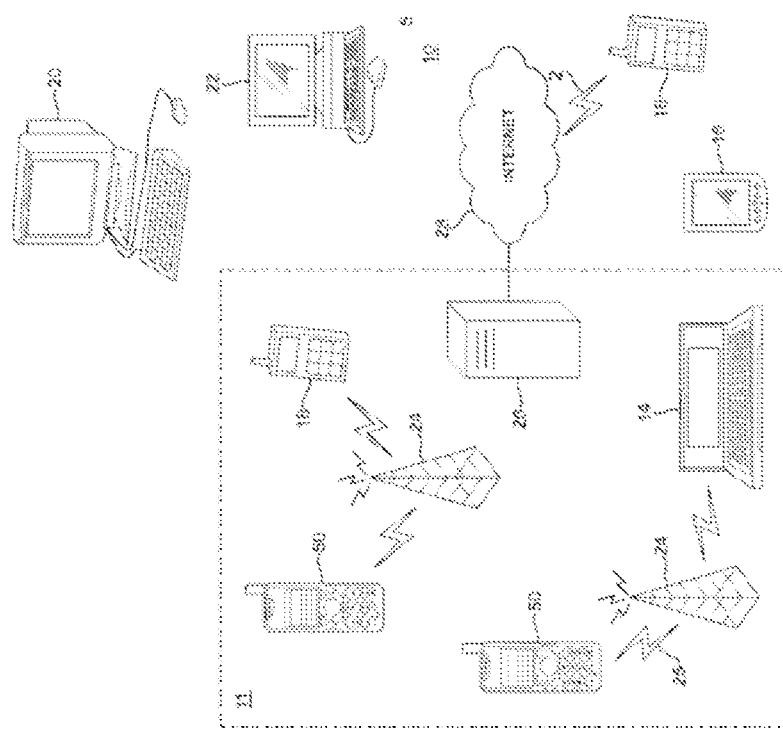
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IOT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IOT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Recently, Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS): protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP: 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The embodiments of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single file or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from [www.ietf.org/rfc/rfc3550.txt (last accessed on Sep. 29, 2021)]. In RTP transport, media data is encapsulated into RTP packets. Typically, each media type or media coding format has a dedicated RTP payload format.

RTP is designed to carry a multitude of multimedia formats, which permits the development of new formats without revising the RTP standard. To this end, the information required by a specific application of the protocol is not included in the generic RTP header. For a class of applications (e.g., audio, video), an RTP profile may be defined. For a media format (e.g., a specific video coding format), an associated RTP payload format may be defined. Every instantiation of RTP in a particular application may require a profile and payload format specifications. For example, an RTP profile for audio and video conferences with minimal control is defined in RFC 3551, and an Audio-Visual Profile with Feedback (AVPF) is specified in RFC 4585. The profile may define a set of static payload type assignments and/or may use a dynamic mechanism for mapping between a payload format and a payload type (PT) value using Session Description Protocol (SDP). The latter mechanism is used for newer video codec such as RTP payload format for H.264 defined in RFC 6184 or RTP Payload Format for HEVC defined in RFC 7798.

RTP is designed to carry a multitude of multimedia formats, which permits the development of new formats without revising the RTP standard. To this end, the information required by a specific application of the protocol is not included in the generic RTP header. For a class of applications (e.g., audio, video), an RTP profile may be defined. For a media format (e.g., a specific video coding format), an associated RTP payload format may be defined. Every instantiation of RTP in a particular application may require a profile and payload format specifications. For example, an RTP profile for audio and video conferences with minimal control is defined in RFC 3551, and an Audio-Visual Profile with Feedback (AVPF) is specified in RFC 4585. The profile may define a set of static payload type assignments and/or may use a dynamic mechanism for mapping between a payload format and a payload type (PT) value using Session Description Protocol (SDP). The latter mechanism is used for newer video codec such as RTP payload format for H.264 defined in RFC 6184 or RTP Payload Format for HEVC defined in RFC 7798.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A point-to-point RTP session includes two endpoints, communicating using unicast. Both RTP and RTCP traffic are conveyed endpoint to endpoint.

Many multipoint audio-visual conferences operate utilizing a centralized unit, which may be called Multipoint Control Unit (MCU). An MCU may implement the functionality of an RTP translator or an RTP mixer. An RTP translator may be a media translator that may modify the media inside the RTP stream. A media translator may for example decode and re-encode the media content (e.g., transcode the media content). An RTP mixer is a middlebox that aggregates multiple RTP streams that are part of a session by generating one or more new RTP streams. An RTP mixer may manipulate the media data. One common application for a mixer is to allow a participant to receive a session with a reduced number of resources compared to receiving individual RTP streams from all endpoints. A mixer can be viewed as a device terminating the RTP streams received from other endpoints in the same RTP session. Using the media data carried in the received RTP streams, a mixer generates derived RTP streams that are sent to the receiving endpoints.

The Session Description Protocol (SDP) may be used to convey media details, transport addresses, and other session description metadata, when initiating multimedia teleconferences, voice-over-IP calls, or other multimedia delivery sessions. SDP is a format for describing multimedia communication sessions for the purposes of announcement and invitation. SDP does not deliver any media streams itself but may be used between endpoints e.g., for negotiation of network metrics, media types, and/or other associated properties. SDP is extensible for the support of new media types and formats.

SDP uses attributes to extend the core protocol. Attributes can appear within the Session or Media sections and are scoped accordingly as session-level or media-level. New attributes can be added to the standard through registration with IANA. A media description may contain any number of "a=" lines (attribute-fields) that are media description specific. Session-level attributes convey additional information that applies to the session as a whole rather than to individual media descriptions.

The "fmtp" attribute of SDP allows parameters that are specific to a particular format to be conveyed in a way that SDP does not have to understand them. The format must be one of the formats specified for the media. Format-specific parameters, semicolon separated, may be any set of parameters required to be conveyed by SDP and given unchanged to the media tool that will use this format. At most one instance of this attribute is allowed for each format.

The SDP offer/answer model specifies a mechanism in which endpoints achieve a common operating point of media details and other session description metadata when initiating the multimedia delivery session. One endpoint, the offerer sends a session description (the offer) to the other endpoint, the answerer. The offer contains all the media parameters needed to exchange media with the offerer, including codecs, transport addresses, and protocols to transfer media. When the answerer receives an offer, it elaborates an answer and sends it back to the offerer. The answer contains the media parameters that the answerer is willing to use for that particular session. SDP may be used as the format for the offer and the answer.

An initial SDP offer includes zero or more media streams, wherein each media stream is described by an "m=" line and its associated attributes. Zero media streams implies that the offerer wishes to communicate, but that the streams for the session will be added at a later time through a modified offer.

A direction attribute may be used in the SDP offer/answer model as follows. If the offerer wishes to only send media on a stream to its peer, it marks the stream as sendonly with the "a=sendonly" attribute. If the offerer wishes to only receive media from its peer, it marks the stream as recvonly. If the offerer wishes to both send and receive media with its peer, it may include an "a=sendrecv" attribute in the offer, or it may omit it, since sendrecv is the default.

In the SDP offer/answer model, the list of media formats for each media stream comprises the set of formats (codecs and any parameters associated with the codec, in the case of RTP) that the offerer is capable of sending and/or receiving (depending on the direction attributes). If multiple formats are listed, it means that the offerer is capable of making use of any of those formats during the session and thus the answerer may change formats in the middle of the session, making use of any of the formats listed, without sending a new offer. For a sendonly stream, the offer indicates those formats the offerer is willing to send for this stream. For a recvonly stream, the offer indicates those formats the offerer is willing to receive for this stream. For a sendrecv stream, the offer indicates those codecs or formats that the offerer is willing to send and receive with. The list of media formats in the "m=" line is listed in the order preference, the first entry in the list being the most preferred.

SDP may be used for declarative purposes, e.g., for describing a stream available to be received over a streaming session. For example, SDP may be included in Real Time Streaming Protocol (RTSP).

A Multipurpose Internet Mail Extension (MIME) is an extension to an email protocol which makes it possible to transmit and receive different kinds of data files on the Internet, for example video, audio, images, and software. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

One of the original motivations for MIME is the ability to identify the specific media type of a message part. However, due to various factors, it is not always possible from looking at the MIME type and subtype to know which specific media formats are contained in the body part or which codecs are indicated in order to render the content. Optional media parameters may be provided in addition to the MIME type and subtype to provide further details of the media content.

Optional media parameters may be conveyed in SDP, e.g., using the "a=fmtp" line of SDP. Optional media parameters may be specified to apply for certain direction attribute(s) with an SDP offer/answer and/or for declarative purposes. Optional media parameters may be specified not to apply for certain direction attribute(s) with an SDP offer/answer and/or for declarative purposes. Semantics of optional media parameters may depend on and may differ based on which direction attribute(s) of an SDP offer/answer they are used with and/or whether they are used for declarative purposes.

An example of an optional media parameter specified in the Internet Draft for VVC is sprop-sei. When present, sprop-sei conveys one or more SEI messages that describe bitstream characteristics. A decoder can rely on the bitstream characteristics that are described in the SEI messages carried within sprop-sei for the entire duration of the session, independently of the persistence scopes of the SEI messages specified in H.274/VSEI or VVC. The value of sprop-sei may be defined as a comma-separated list, where each list element is a base64 representation (as defined in RFC 4648) of an SEI NAL unit.

In an example, empty or truncated SEI message payloads are allowed in sprop-sei to indicate the capability of the offerer to encode these SEI messages with any SEI message payload that starts with the bits included in sprop-sei (if any).

In an example, an optional recv-sei MIME parameter in an SDP answer indicate which SEI messages must be present in the bitstream from the offerer to the answerer. The SEI messages in recv-sei may be allowed or required to be of the following types: the SEI message may be required to be the same as directly included in the sprop-sei of the offer; the SEI message may be required to have a type indicated in a SEI manifest SEI message in the sprop-sei of the offer; the SEI message may be required to have a type and start with the respective content indicated by a SEI prefix indication SEI message contained within the srop-sei. When an SEI message with a particular SEI message type is present in sprop-sei of an offer and is absent in recv-sei in an answer, it may indicate that the answerer does not support the processing the SEI message included in sprop-sei.

In an example, an optional recv-sei MIME parameter is introduced along the following principles: The SEI messages included in recv-sei in an answer indicate which SEI messages must be present in the bitstream from the offerer to the answerer. When recv-sei is present in an answer, the SEI message types in recv-sei may be required to be the same as or a subset of those included in the sprop-sei of the offer. When recv-sei is present in an answer, the SEI message payload for a particular SEI message type in recv-sei may be required to start with the SEI message payload bits present (if any) in recv-sei for the same SEI message type. It is suggested to allow empty or truncated SEI message payloads in recv-sei to indicate that the answerer has the liberty to encode any values for remaining of the SEI message payload (as long as they conform to the specification where the SEI message is specified). When an SEI message with a particular SEI message type is present in sprop-sei of an offer and is absent in recv-sei in an answer, it may indicate that the answerer does not support the processing the SEI message included in sprop-sei.

In an example, an optional MIME parameter in an SDP offer from the offerer to the answerer contains an SEI NAL unit containing an SEI manifest SEI message and one or more SEI prefix indication SEI messages to indicate a capability of an encoder in the offerer to encode SEI messages as indicated by the semantics of the SEI manifest SEI message and the one or more SEI prefix indication SEI messages and encode a bitstream obeying the constraints implied by the encoded SEI messages.

In an example, an optional MIME parameter in an SDP answer from the answerer to the offerer contains an SEI NAL unit containing an SEI manifest SEI message and one or more SEI prefix indication SEI messages to indicate a requirement or preference of the offerer for encoded SEI messages included in the bitstream from the offerer to the answerer, as indicated by the semantics of the SEI manifest SEI message and the one or more SEI prefix indication SEI messages.

Video codec consists of an encoder that transforms the input video into a compressed representation suited for storage/transmission and a decoder that can decompress the compressed video representation back into a viewable form. A video encoder and/or a video decoder may also be separate from each other, for example, need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or 'block') are predicted for example by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Scalable video coding refers to coding structure where one bitstream can contain multiple representations of the content e.g. at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver.

Scalable video coding may be realized through multi-layered coding. Multi-layered coding is a concept wherein an un-encoded visual representation of a scene is, by processes such as transformation and filtering, mapped into multiple dependent or independent representations (called layers). One or more encoders are used to encode a layered visual representation. When the layers contain redundancies, the use of a single encoder can, by using inter-layer prediction techniques, encode with a significant gain in coding efficiency. Layered video coding is typically used to provide some form of scalability in services—e.g. quality scalability, spatial scalability, temporal scalability, and view scalability.

A portion of a scalable video bitstream that provides a certain decoded representation, such as a base quality video or a depth map video for a bitstream that also contains texture video, and is independently decodable from other portions of the scalable video bitstream, may be referred to as an independent layer. A scalable video bitstream may comprise multiple independent layers, e.g. a texture video layer, a depth video layer, and an alpha map video layer. A portion of a scalable video bitstream that provides a certain decoded representation or enhancement, such as a quality enhancement to a particular fidelity or a resolution enhancement to a certain picture width and height in samples, and requires decoding of one or more other layers (a.k.a. reference layers) in the scalable video bitstream due to inter-layer prediction may be referred to as a dependent layer or a predicted layer.

In some scenarios, a scalable bitstream includes a "base layer", which may provide a basic representation, such as the lowest quality video available, and one or more enhancement layers. In order to improve coding efficiency for an enhancement layer, the coded representation of that layer may depend on one or more of the lower layers, i.e. inter-layer prediction may be applied. E.g. the motion and mode information of the enhancement layer can be predicted from lower layers. Similarly, the pixel data of the lower layers can be used to create prediction for the enhancement layer. The term enhancement layer may refer to enhancing one or more aspects of reference layer(s), such as quality or resolution. A portion of the bitstream that remains after removal of all enhancement layers may be referred to as the base layer.

It needs to be understood that the term layer may be conceptual, i.e. the bitstream syntax might not include signaling of layers or the signaling of layers is not in use in a scalable bitstream that conceptually comprises several layers. The term scalability layer may be used interchangeably with the term layer.

Figure 4:
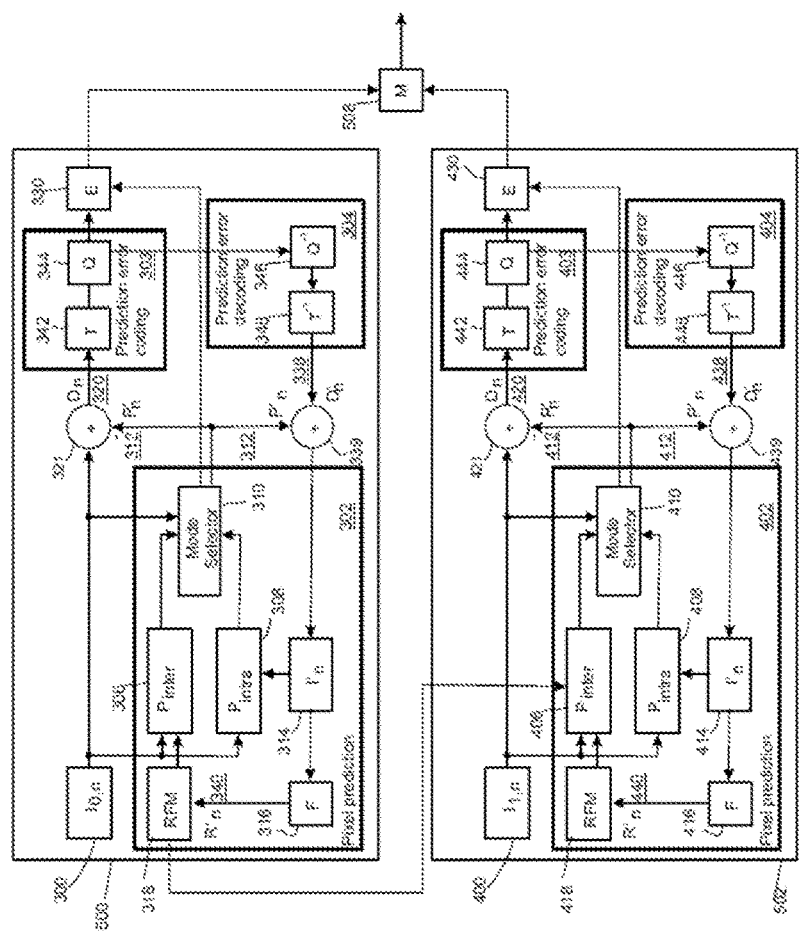
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
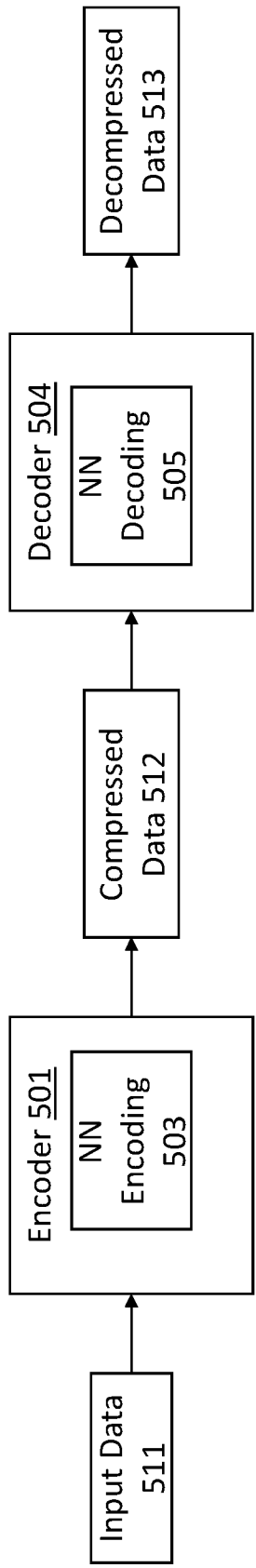
FIG. 5 is a block diagram showing the interface between an encoder and a decoder in accordance with the examples described herein.

FIG. 5 is a block diagram showing the interface between an encoder 501 implementing neural network encoding 503, and a decoder 504 implementing neural network decoding 505 in accordance with the examples described herein. The encoder 501 may embody a device, software method or hardware circuit. The encoder 501 has the goal of compressing input data 511 (for example, an input video) to compressed data 512 (for example, a bitstream) such that the bitrate is minimized, and the accuracy of an analysis or processing algorithm is maximized. To this end, the encoder 501 uses an encoder or compression algorithm, for example to perform neural network encoding 503.

The general analysis or processing algorithm may be part of the decoder 504. The decoder 504 uses a decoder or decompression algorithm, for example to perform the neural network decoding 505 to decode the compressed data 512 (for example, compressed video) which was encoded by the encoder 501. The decoder 504 produces decompressed data 513 (for example, reconstructed data).

The encoder 501 and decoder 504 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

Figure 6:
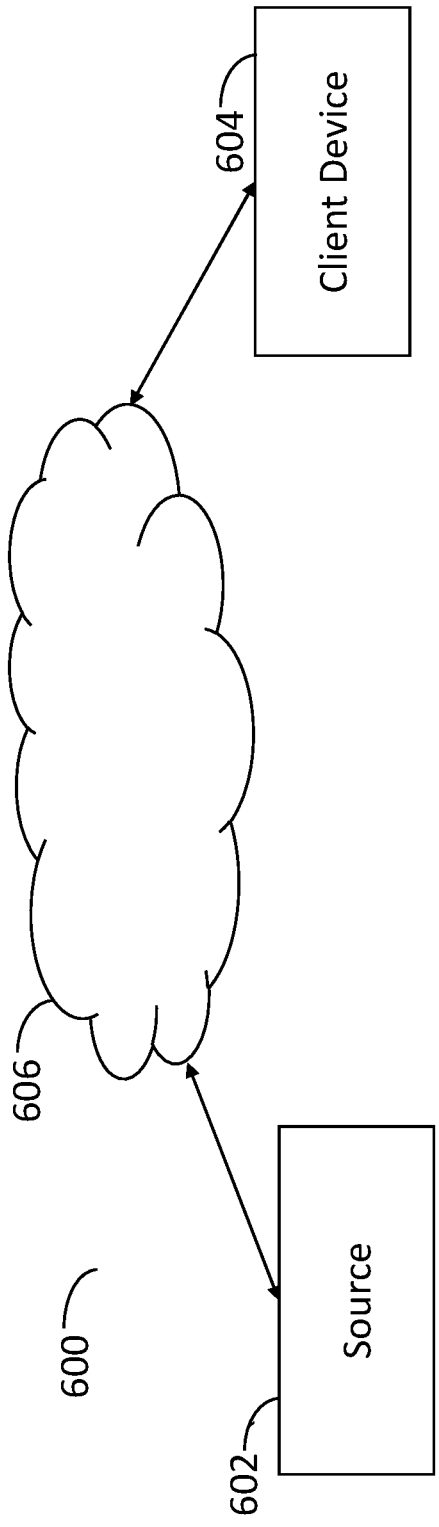
FIG. 6 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured for specifying a neural network that is used as a post-processing filter, cancelling a use of a previous post-processing filter, or specifying the purpose of a post-filter. In this regard, FIG. 6 depicts an example of such a system 600 that includes a source 602 of media data and associated metadata. The source may be, in one embodiment, a server. However, the source may be embodied in other manners if so desired. The source is configured to stream the media data or media item and associated metadata to the client device 604. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, the media data and metadata are streamed via a network 606, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 7:
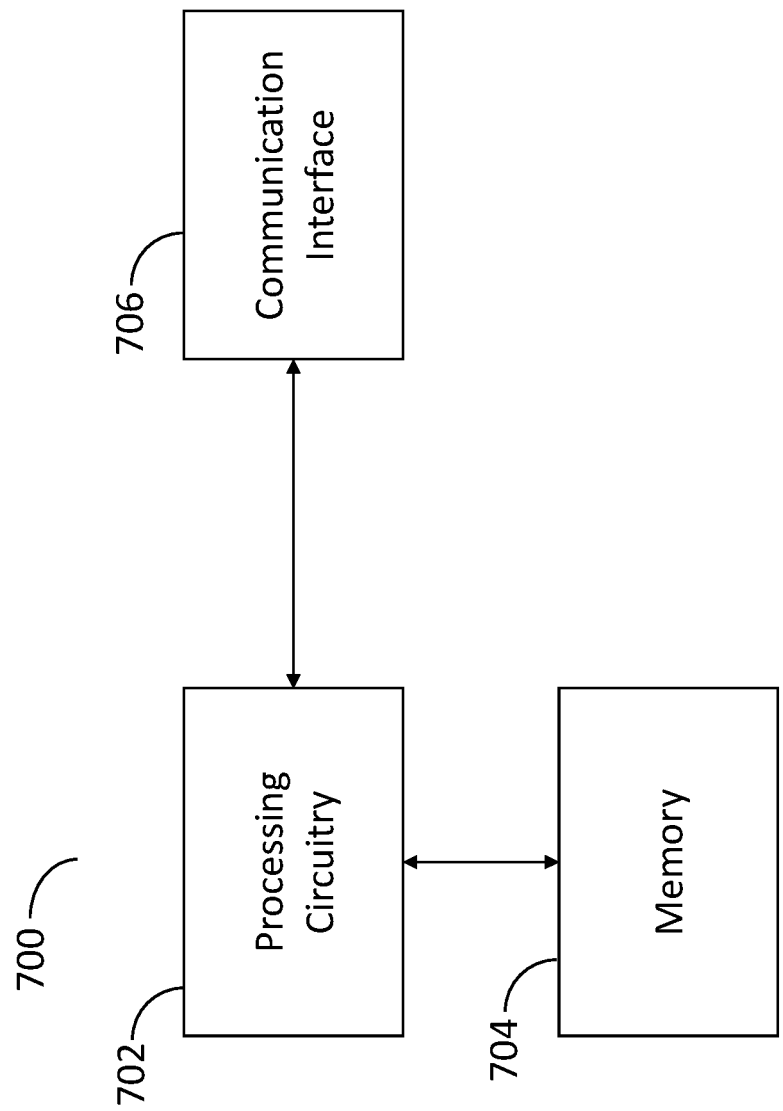
FIG. 7 is a block diagram of an apparatus that may be specifically configured in accordance with an example embodiment.

An apparatus 700 is provided in accordance with an example embodiment as shown in FIG. 7. In one embodiment, the apparatus of FIG. 7 may be embodied by a source 602, such as a file writer which, in turn, may be embodied by a server, that is configured to stream a compressed representation of the media data and associated metadata. In an alternative embodiment, the apparatus may be embodied by a client device 604, such as a file reader which may be embodied, for example, by any of the various computing devices described above. In either of these embodiments and as shown in FIG. 7, the apparatus of an example embodiment includes, is associated with or is in communication with processing circuitry 702, one or more memory devices 704, a communication interface 706 and optionally a user interface.

The processing circuitry 702 may be in communication with the memory device 704 via a bus for passing information among components of the apparatus 700. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 700 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip.' As such, in some cases, a chip or chipset may constitute means for performing one or more operations for providing the functionalities described herein.

The processing circuitry 702 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 706 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 700 may optionally include a user interface that may, in turn, be in communication with the processing circuitry 702 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Fundamentals of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they are able to learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

If the network is learning at all—in this case, the training set error should decrease, otherwise the model is in the regime of underfitting.

If the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized the training set's properties and performs well only on that set, but performs poorly on a set not used for tuning or training its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion is usually mean squared error (MSE), peak signal to noise ratio (PSNR), structural similarity (SSIM) index, or similar metrics. These distortion metrics are meant to be inversely proportional to the human visual perception quality.

In various embodiments, terms 'model', 'neural network', 'neural net' and 'network' may be used interchangeably, and also the weights of neural networks may be sometimes referred to as learnable parameters or as parameters.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or 'block') are predicted. In an example, the pixel values may be predicted by using motion compensation algorithm. This prediction technique includes finding and indicating an area in one of the previously coded video frames that corresponds closely to the block being coded.

In other example, the pixel values may be predicted by using spatial prediction techniques. This prediction technique uses the pixel values around the block to be coded in a specified manner. Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain. After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently those are typically coded differentially with respect to block specific predicted motion vectors. In typical video codecs, the predicted motion vectors are created in a predefined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired Macroblock mode and associated motion vectors. This kind of cost function uses a weighting factor λ to tie together the exact or estimated image distortion due to lossy coding methods and the exact or estimated amount of information that is required to represent the pixel values in an image area:

$$C=D+\lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

An elementary unit for the output of a video encoder and the input of a video decoder, respectively, may be a Network Abstraction Layer (NAL) unit. For transport over packet-oriented networks or storage into structured files, NAL units may be encapsulated into packets or similar structures. A bytestream format encapsulating NAL units may be used for transmission or storage environments that do not provide framing structures. The bytestream format may separate NAL units from each other by attaching a start code in front of each NAL unit. To avoid false detection of NAL unit boundaries, encoders may run a byte-oriented start code emulation prevention algorithm, which may add an emulation prevention byte to the NAL unit payload if a start code would have occurred otherwise. In order to enable straightforward gateway operation between packet- and stream-oriented systems, start code emulation prevention may be performed regardless of whether the bytestream format is in use or not. A NAL unit may be defined as a syntax structure containing an indication of the type of data to follow and bytes containing that data in the form of a raw byte sequence payload interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

In some coding standards, NAL units consist of a header and payload. The NAL unit header indicates the type of the NAL unit. In some coding standards, the NAL unit header indicates a scalability layer identifier (e.g. called nuh_layer_id in H.265/HEVC and H.266/VVC), which could be used e.g. for indicating spatial or quality layers, views of a multiview video, or auxiliary layers (such as depth maps or alpha planes). In some coding standards, the NAL unit header includes a temporal sublayer identifier, which may be used for indicating temporal subsets of the bitstream, such as a 30-frames-per-second subset of a 60-frames-per-second bitstream.

NAL units may be categorized into Video Coding Layer (VCL) NAL units and non-VCL NAL units. VCL NAL units are typically coded slice NAL units.

A non-VCL NAL unit may be, for example, one of the following types: a video parameter set (VPS), a sequence parameter set (SPS), a picture parameter set (PPS), an adaptation parameter set (APS), a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure, for example, using an identifier.

Some types of parameter sets are briefly described in the following, but it needs to be understood, that other types of parameter sets may exist and that embodiments may be applied but are not limited to the described types of parameter sets.

Parameters that remain unchanged through a coded video sequence may be included in a sequence parameter set. Alternatively, an SPS may be limited to apply to a layer that references the SPS, e.g. an SPS may remain valid for a coded layer video sequence. In addition to the parameters that may be needed by the decoding process, the sequence parameter set may optionally contain video usability information (VUI), which includes parameters that may be important for buffering, picture output timing, rendering, and resource reservation.

A picture parameter set contains such parameters that are likely to be unchanged in several coded pictures. A picture parameter set may include parameters that can be referred to by the VCL NAL units of one or more coded pictures.

A video parameter set (VPS) may be defined as a syntax structure containing syntax elements that apply to zero or more entire coded video sequences and may contain parameters applying to multiple layers. VPS may provide information about the dependency relationships of the layers in a bitstream, as well as many other information that are applicable to all slices across all layers in the entire coded video sequence.

A video parameter set RBSP may include parameters that can be referred to by one or more sequence parameter set RBSPs.

The relationship and hierarchy between a video parameter set (VPS), a sequence parameter set (SPS), and a picture parameter set (PPS) may be described as follows. A VPS resides one level above an SPS in the parameter set hierarchy and in the context of scalability. The VPS may include parameters that are common for all slices across all layers in the entire coded video sequence. The SPS includes the parameters that are common for all slices in a particular layer in the entire coded video sequence, and may be shared by multiple layers. The PPS includes the parameters that are common for all slices in a particular picture and are likely to be shared by all slices in multiple pictures.

An Adaptation Parameter Set (APS) may be specified in some coding formats, such as H.266/VVC. An APS may be allowed to apply to one or more image segments, such as slices. In H.266/VVC, an APS may be defined as a syntax structure containing syntax elements that apply to zero or more slices as determined by zero or more syntax elements found in slice headers or in a picture header. An APS may comprise a type (aps_params_type in H.266/VVC) and an identifier (aps_adaptation_parameter_set_id in H.266/VVC). The combination of an APS type and an APS identifier may be used to identify a particular APS. H.266/VVC comprises three APS types: an adaptive loop filtering (ALF), a luma mapping with chroma scaling (LMCS), and a scaling list APS types. The ALF APS(s) are referenced from a slice header (thus, the referenced ALF APSs can change slice by slice), and the LMCS and scaling list APS(s) are referenced from a picture header (thus, the referenced LMCS and scaling list APSs can change picture by picture). In H.266/VVC, the APS RBSP has the following syntax:

| adaptation_parameter_set_rbsp( ) { | Descriptor |
|---|---|
| aps_params_type | u(3) |
| aps_adaptation_parameter_set_id | u(5) |
| aps_chroma_present_flag | u(1) |
| if( aps_params_type == ALF_APS ) | |
|   alf_data( ) | |
| else if( aps_params_type == LMCS_APS ) | |
|   lmcs_data( ) | |
| else if( aps_params_type == SCALING_APS ) | |
|   scaling_list_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

Many instances of parameter sets may be allowed in a bitstream, and each instance is identified with a unique identifier. In order to limit the memory usage needed for parameter sets, the value range for parameter set identifiers has been limited. Each slice header (in HEVC) or each picture header (in VVC) includes the identifier of the picture parameter set that is active for the decoding of the picture that contains the slice or the picture, respectively, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets 'out-of-band' using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file.

A parameter set may be activated or referenced by a reference (to its identifier) from a slice, a picture header, or from another active or referenced parameter set or in some cases from another syntax structure.

Video coding specifications may enable the use of supplemental enhancement information (SEI) messages or alike. Some video coding specifications include SEI NAL units, and some video coding specifications contain both prefix SEI NAL units and suffix SEI NAL units. A prefix SEI NAL unit can start a picture unit or alike; and a suffix SEI NAL unit can end a picture unit or alike. Hereafter, an SEI NAL unit may equivalently refer to a prefix SEI NAL unit or a suffix SEI NAL unit. An SEI NAL unit includes one or more SEI messages, which are not required for the decoding of output pictures but may assist in related processes, such as picture output timing, post-processing of decoded pictures, rendering, error detection, error concealment, and resource reservation.

The syntax of an SEI NAL unit may be specified as follows:

| sei_rbsp( ) { | Descriptor |
|---|---|
| do | |
| sei_message( ) | |
| while( more_rbsp_data( ) ) | |
| rbsp_trailing_bits( ) | |
| } | |

The syntax of an SEI message may be specified as follows:

| sei_message( ) { | Descriptor |
|---|---|
| payloadType = 0 | |
| do { | |
| payload_type_byte | u(8) |
| payloadType += payload_type_byte | |
| } while( payload_type_byte == 0xFF ) | |
| payloadSize = 0 | |
| do { | |
| payload_size_byte | u(8) |
| payloadSize += payload_size_byte | |
| } while( payload_size_byte == 0xFF ) | |
| sei_payload( payloadType, payloadSize ) | |
| } | |

The variable payloadType may indicate the type of the SEI message and the variable payloadSize may indicate the number of bytes in the SEI message payload, i.e. sei_payload( ). The syntax and semantics of sei_payload( ) may depend on payloadType.

Several SEI messages are specified in H.264/AVC, H.265/HEVC, H.266/VVC, and H.274/VSEI standards, and the user data SEI messages enable organizations and companies to specify SEI messages for specific use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A design principle has been followed for SEI message specifications: the SEI messages are generally not extended in future amendments or versions of the standard.

An SEI manifest SEI message has been specified in the H.265/HEVC standard and is also included in a draft version 2 of the H.266/VVC standard. An SEI manifest SEI message conveys information on SEI messages that are indicated as expected (i.e., likely) to be present or not present in a coded video sequence (CVS) or a bitstream. Such information may include the following:

The indication that certain types of SEI messages are expected (i.e., likely) to be present (although not guaranteed to be present) in the CVS.

For each type of SEI message that is indicated as expected (e.g., likely) to be present in the CVS, the degree of expressed necessity of interpretation of the SEI messages of this type, as follows:

The degree of necessity of interpretation of an SEI message type may be indicated as "necessary", "unnecessary", or "undetermined".

An SEI message is indicated by the encoder (i.e., the content producer) as being "necessary" when the information conveyed by the SEI message is considered as necessary for interpretation by the decoder or receiving system in order to properly process the content and enable an adequate user experience; it does not mean that the bitstream is required to contain the SEI message in order to be a conforming bitstream. It is at the discretion of the encoder to determine which SEI messages are to be considered as necessary in a particular CVS.

The indication that certain types of SEI messages are expected (e.g., likely) not to be present (although not guaranteed not to be present) in the CVS.

The content of an SEI manifest SEI message may, for example, be used by transport-layer or systems-layer processing elements to determine whether the CVS is suitable for delivery to a receiving and decoding system, based on whether the receiving system can properly process the CVS to enable an adequate user experience or whether the CVS satisfies the application needs.

It may be required that an SEI NAL unit containing an SEI manifest SEI message does not contain any other SEI messages other than SEI prefix indication SEI messages. When present in an SEI NAL unit, the SEI manifest SEI message may be required to be the first SEI message in the SEI NAL unit.

An SEI prefix indication SEI message has been specified in the H.265/HEVC standard and is also included in a draft version 2 of the H.266/VVC standard. The SEI prefix indication SEI message carries one or more SEI prefix indications for SEI messages of a particular value of SEI payload type (payloadType). Each SEI prefix indication is a bit string that follows the SEI payload syntax of that value of payloadType and contains a number of complete syntax elements starting from the first syntax element in the SEI payload.

Each SEI prefix indication for an SEI message of a particular value of payloadType indicates that one or more SEI messages of this value of payloadType are expected or likely to be present in the coded video sequence (CVS) and to start with the provided bit string. A starting bit string would typically contain only a true subset of an SEI payload of the type of SEI message indicated by the payloadType, may contain a complete SEI payload, and shall not contain more than a complete SEI payload. It is not prohibited for SEI messages of the indicated value of payloadType to be present that do not start with any of the indicated bit strings.

SEI prefix indications should provide sufficient information for indicating what type of processing is needed or what type of content is included. The former (type of processing) indicates decoder-side processing capability, e.g., whether some type of frame unpacking is needed. The latter (type of content) indicates, for example, whether the bitstream contains subtitle captions in a particular language.

The content of an SEI prefix indication SEI message may, for example, be used by transport-layer or systems-layer processing elements to determine whether the CVS is suitable for delivery to a receiving and decoding system, based on whether the receiving system can properly process the CVS to enable an adequate user experience or whether the CVS satisfies the application needs.

The phrase along the bitstream (e.g. indicating along the bitstream) or along a coded unit of a bitstream (e.g. indicating along a coded tile) may be used in claims and described embodiments to refer to transmission, signaling, or storage in a manner that the 'out-of-band' data is associated with, but not included within, the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as the sample entry for a track containing the bitstream, a sample group for the track containing the bitstream, or a timed metadata track associated with the track containing the bitstream. In another example, the phrase along the bitstream may be used when the bitstream is made available as a stream over a communication protocol and a media description, such as a streaming manifest, is provided to describe the stream.

A bitstream may be defined to logically include a syntax structure, such as a NAL unit, when the syntax structure is transmitted along the bitstream but could be included in the bitstream according to the bitstream format. A bitstream may be defined to natively comprise a syntax structure, when the bitstream includes the syntax structure.

A coded video sequence (CVS) may be defined as a sequence of coded pictures in decoding order that is independently decodable and is followed by another coded video sequence or the end of the bitstream.

A coded layer video sequence (CLVS) may be defined as a sequence of picture units (PUs) with the same scalable layer (e.g. with the same value of nuh_layer_id in VVC) that consists, in decoding order, of a CLVS Start Picture Unit (CLVSS PU), followed by zero or more PUs that are not CLVSS PUs, including all subsequent PUs up to but not including any subsequent PU that is a CLVSS PU. A picture unit (PU) may be defined as a coded picture and all non-VCL NAL units associated with the coded picture. A CLVSS PU may be defined as a PU that is allowed to start a CLVS, i.e. that can start a decoding process of the layer. A CLVSS PU may for example comprise an intra random access point (IRAP) picture or a gradual decoding refresh (GDR) picture.

A syntax element may be defined as an element of data represented in a bitstream. A syntax structure may be defined as zero or more syntax elements present together in a bitstream in a specified order.

An identifier may be defined as a syntax element that identifies a syntax structure. A value of the identifier may for example differ in different instances of the same syntax structure, such as a parameter set. A particular instance of the syntax structure may be referenced through its identifier value. For example, a parameter set that is referenced by the (de)coding of a coded video slice may be identified by providing the identifier value of the parameter set in a header of the coded video slice.

An indicator (idc) may be defined as a syntax element whose value indicates a selection among more than two values (for which semantics have been specified). An indicator syntax element may have _idc postfix in its name.

An independently parsable structure within a container structure may be defined to be such a structure that can be parsed or decoded without fully parsing or decoding earlier structures or syntax elements in the same container structure. For example, SEI messages within an SEI NAL unit are independently parsable, since parsing of any earlier SEI message in the same SEI NAL unit can be skipped by resolving payloadSize and skipping the number of bytes indicated by payloadSize. Another example of an independently parsable structures is a syntax structure at a pre-defined bit position within a container structure. Yet another way to achieve independently parsable structures is to include position offsets to independently parsable structures into a container structure, wherein the bit position of an independently parsable structure is derivable from one or more of the position offsets.

Filters in Video Codecs

Conventional image and video codecs use a set of filters to enhance the visual quality of the predicted visual content and can be applied either in-loop or out-of-loop, or both. In the case of in-loop filters, the filter applied on one block in the currently-encoded frame will affect the encoding of another block in the same frame and/or in another frame which is predicted from the current frame. An in-loop filter can affect the bitrate and/or the visual quality. An enhanced block may cause a smaller residual, difference between original block and predicted-and-filtered block, thus using less bits in the bitstream output by the encoder. An out-of-loop filter may be applied on a frame after it has been reconstructed, the filtered visual content may not be a source for prediction, and thus it may only impact the visual quality of the frames that are output by the decoder.

Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which is different from a quality metric for human perceptual quality, when considering media compression in inter-machine communications. Also, dedicated algorithms for compressing and decompressing data for machine consumption are likely to be different than those for compressing and decompressing data for human consumption. The set of tools and concepts for compressing and decompressing data for machine consumption is referred to here as Video Coding for Machines.

It is likely that the receiver-side device has multiple 'machines' or neural networks (NNs). These multiple machines may be used in a certain combination which is for example determined by an orchestrator sub-system. The multiple machines may be used for example in temporal succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of objects in the frames.

In various embodiments, machine and neural network may be referred interchangeably, and may mean to include, any process or algorithm (e.g. learned or not from data) which analyzes or processes data for a certain task. Following paragraphs may specify in further details other assumptions made regarding the machines considered in various embodiments of the invention.

Also, term 'receiver-side' or 'decoder-side' refers to a physical or abstract entity or device which contains one or more machines, circuits or algorithms; and runs these one or more machines on some encoded and eventually decoded video representation which is encoded by another physical or abstract entity or device, for example, the 'encoder-side device'.

The encoded video data may be stored into a memory device, for example as a file. The stored file may later be provided to another device.

Alternatively, the encoded video data may be streamed from one device to another.

Figure 8:
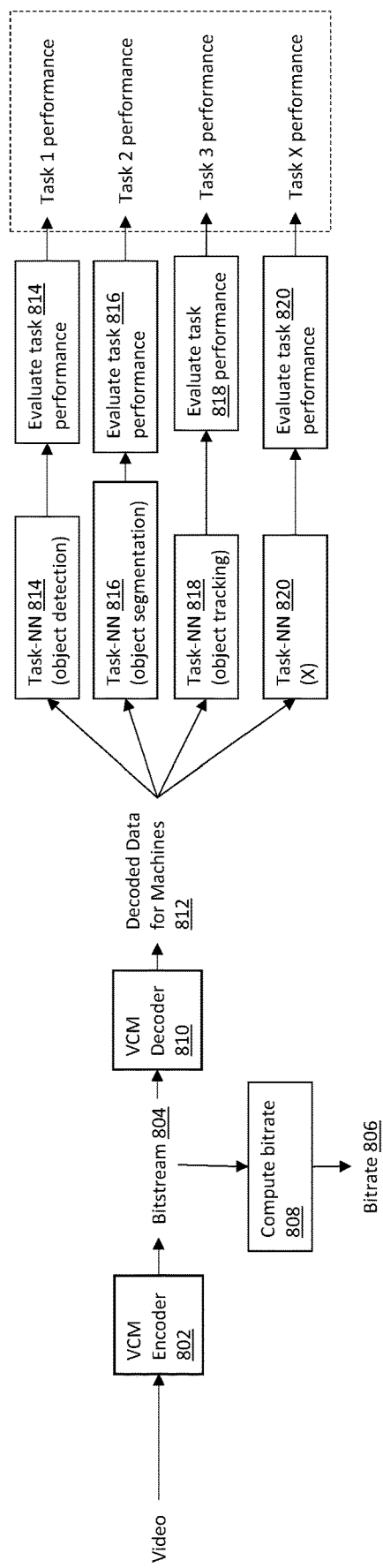
FIG. 8 illustrates a pipeline of video coding for machines (VCM), in accordance of an embodiment.

FIG. 8 illustrates a pipeline of video coding for machines (VCM), in accordance of an embodiment. A VCM encoder 802 encodes the input video into a bitstream 804. A bitrate 806 may be computed 808 from the bitstream 804 in order to evaluate the size of the bitstream 804. A VCM decoder 810 decodes the bitstream 804 output by the VCM encoder 802. An output of the VCM decoder 810 may be referred, for example, as decoded data for machines' 812. This data may be considered as the decoded or reconstructed video. However, in some implementations of the pipeline of VCM, the decoded data for machines 812 may not have same or similar characteristics as the original video which was input to the VCM encoder 802. For example, this data may not be easily understandable by a human by simply rendering the data onto a screen. The output of VCM decoder 810 is then input to one or more task neural network. For the sake of illustration, FIG. 8 is shown to include three example task-NNs, task-NN 814 for object detection, task 816 for image segmentation, task 818 for object tracking, and a non-specified one, task-NN 820 for performing task X. The goal of VCM is to obtain a low bitrate while guaranteeing that the task-NNs still perform well in terms of the evaluation metric associated to each task.

Figure 9:
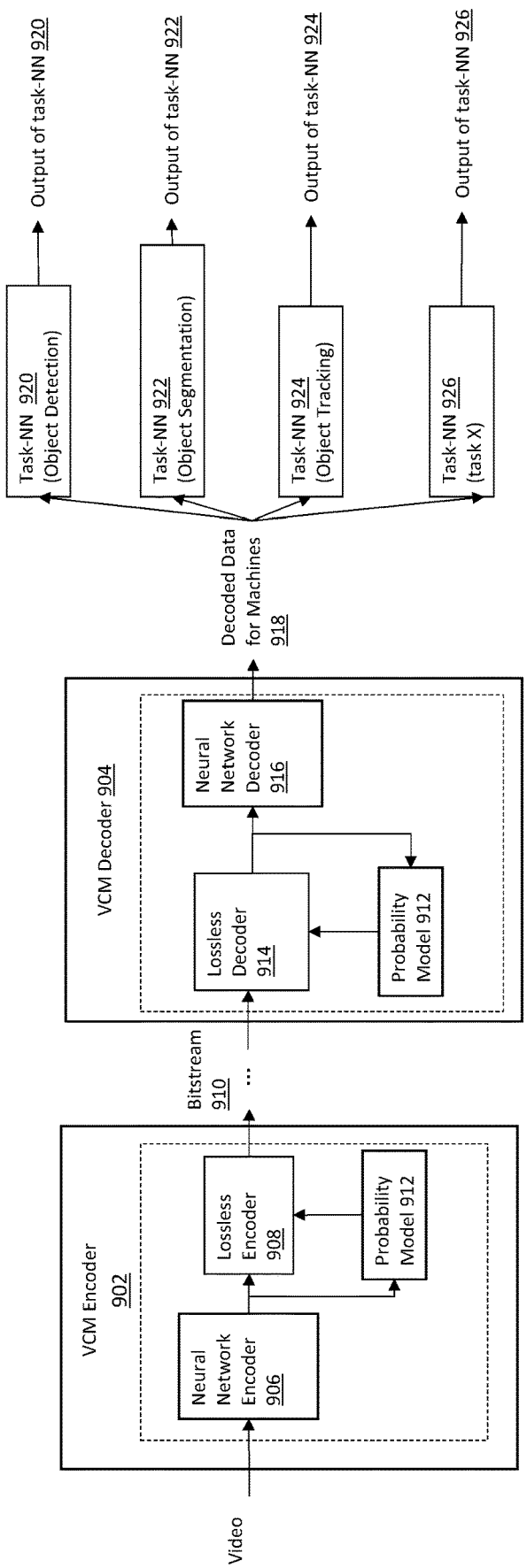
FIG. 9 illustrates an example of an end-to-end learned approach, in accordance with an embodiment.

One of the possible approaches to realize video coding for machines is an end-to-end learned approach. FIG. 9 illustrates an example of an end-to-end learned approach, in accordance with an embodiment. In this approach, the VCM encoder 902 and VCM decoder 904 mainly consist of neural networks. The following figure illustrates an example of a pipeline for the end-to-end learned approach. The video is input to a neural network encoder 906. The output of the neural network encoder 906 is input to a lossless encoder 908, such as an arithmetic encoder, which outputs a bitstream 910. The lossless codec may be a probability model 912, both in the lossless encoder 908 and in a lossless decoder 914, which predicts the probability of the next symbol to be encoded and decoded. The probability model 912 may also be learned, for example it may be a neural network. At a decoder-side, the bitstream 910 is input to the lossless decoder 914, such as an arithmetic decoder, whose output is input to a neural network decoder 916. The output of the neural network decoder 916 is the decoded data for machines, that may be input to one or more task-NNs, task-NN 822 for object detection, task 824 for image segmentation, task 826 for object tracking, and a non-specified one, task-NN 828 for performing task X.

Figure 10:
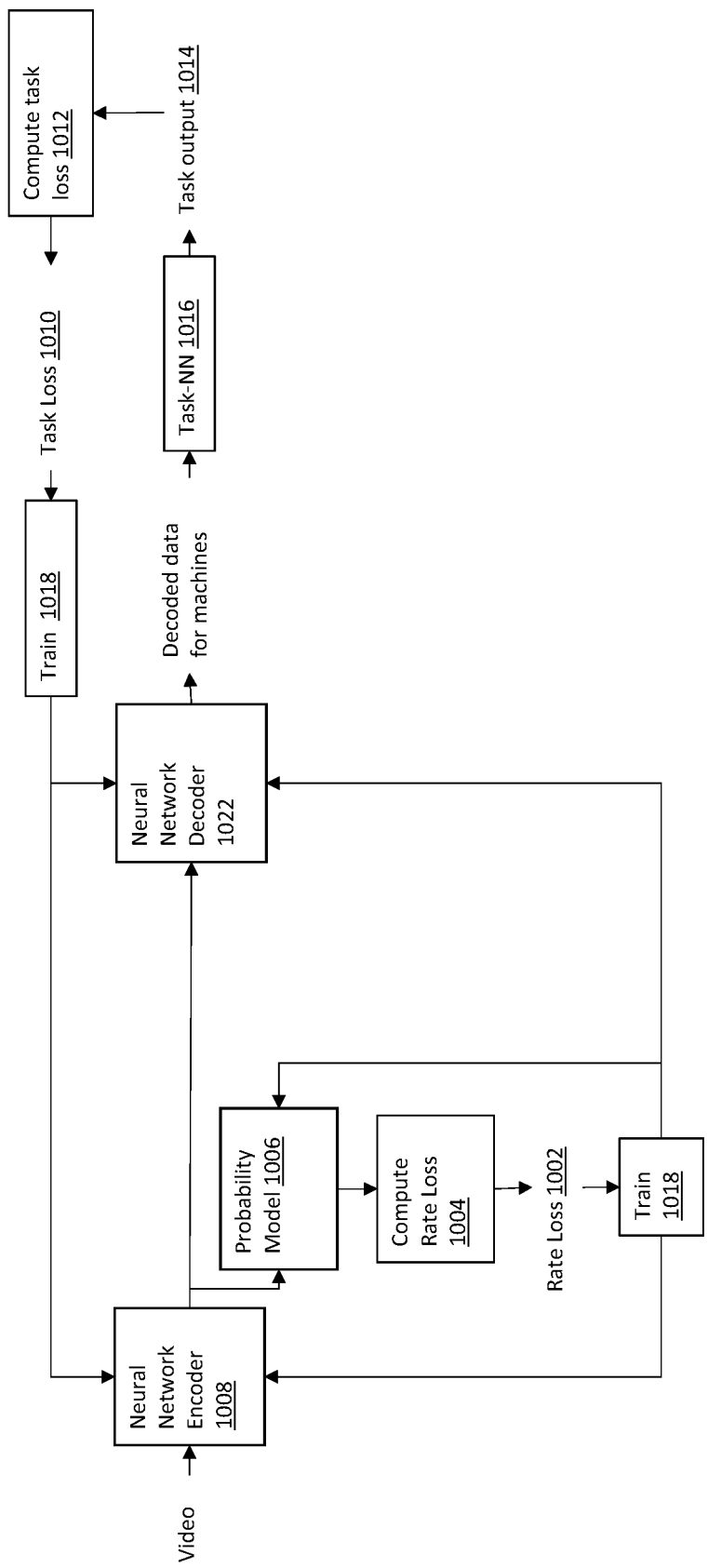
FIG. 10 illustrates an example of how the end-to-end learned system may be trained, in accordance with an embodiment.

FIG. 10 illustrates an example of how the end-to-end learned system may be trained, in accordance with an embodiment. For the sake of simplicity, only one task-NN is illustrated. However, it may be understood that multiple task-NNs may be similarly used in the training process. A rate loss 1002 may be computed 1004 from the output of a probability model 1006. The rate loss 1002 provides an approximation of the bitrate required to encode the input video data, for example, by a neural network encoder 1008. A task loss 1010 may be computed 1012 from a task output 1014 of a task-NN 1016.

The rate loss 1002 and the task loss 1010 may then be used to train 1018 the neural networks used in the system, such as a neural network encoder 1008, probability model, a neural network decoder 1022. Training may be performed by first computing gradients of each loss with respect to the neural networks that are contributing or affecting the computation of that loss. The gradients are then used by an optimization method, such as Adam, for updating the trainable parameters of the neural networks.

Another possible approach to realize video coding for machines is to use a video codec which is mainly based on more conventional components, that is components which are not obtained or derived by machine learning means. For example, H.266/VVC codec can be used. However, some of the components of such a codec may still be obtained or derived by machine learning means. In one example, one or more of the in-loop filters of the video codec may be a neural network. In another example, a neural network may be used as a post-processing operation (out-of-loop). A neural network filter or other type of filter may be used in-loop or out-of-loop for adapting the reconstructed or decoded frames in order to improve the performance or accuracy of one or more machine neural networks.

In some implementations, machine tasks may be performed at decoder side (instead of at encoder side). Some reasons for performing machine tasks at decoder side include, for example, the encoder-side device may not have the capabilities (computational, power, memory, and the like) for running the neural networks that perform these tasks, or some aspects or the performance of the task neural networks may have changed or improved by the time that the decoder-side device needs the tasks results (e.g., different or additional semantic classes, better neural network architecture). Also, there could be a customization need, where different clients would run different neural networks for performing these machine learning tasks.

Figure 11:
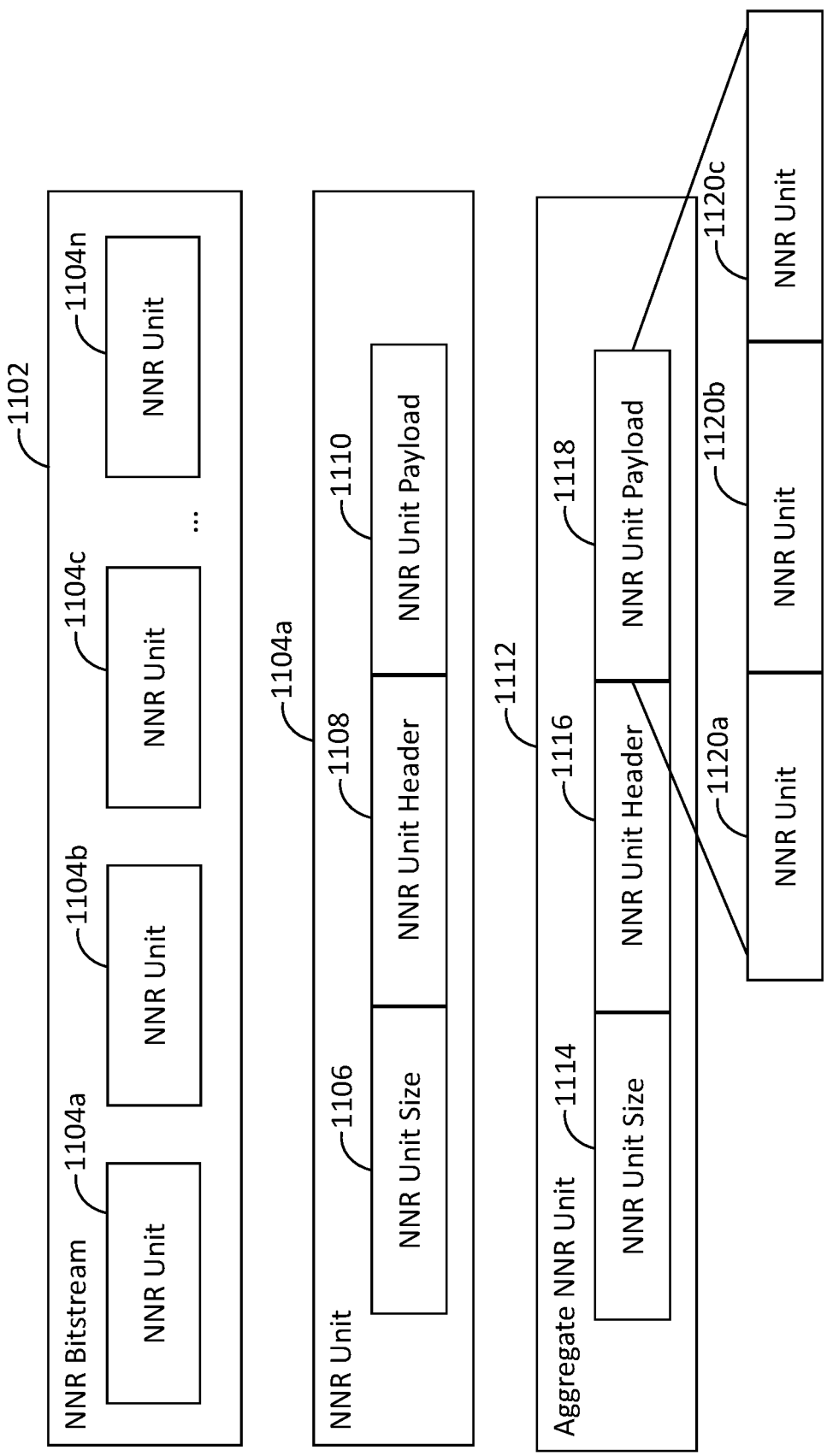
FIG. 11 illustrates example structure of an NNR bitstream.

FIG. 11 illustrates example structure of a neural network representations (NNR) bitstream. An NNR bitstream may conform to ISO/IEC 15938-17 (Compression of Neural Networks for Multimedia Content Description and Analysis). NNR specifies a high-level bitstream syntax (HLS) for signaling compressed neural network data in a channel as a sequence of NNR Units as illustrated in FIG. 11. As depicted in FIG. 11, according to this structure, an NNR bitstream 1102 includes multiple elemental units termed NNR Units (e.g. NNR units 1104a, 1104b, 1104c, ... 1104n). An NNR Unit (e.g. 804a) represents a basic high-level syntax structure, and includes three syntax elements: NNR Unit Size 1106, NNR unit header 1108, NNR unit payload 1110.

In some embodiments, NNR bitstream may include one or more aggregate NNR units. An aggregate NNR unit, for example, an aggregate NNR unit 1112 may include an NNR unit size 1112, an NNR unit header 1116, and an NNR unit payload 1118. An NNR unit payload of aggregate NNR unit may include one or more NNR units. As shown in FIG. 11, the NNR unit payload 1118 includes an NNR unit 1120a, an NNR unit 1120b, and an NNR 1120c. The NNR units 1120a, 1120b, and 1120c may include an NNR unit size, an NNR unit header, and an NNR unit payload, each of which may contain zero or more syntax elements.

As mentioned above, a bitstream may be formed by concatenating several NNR Units, aggregate NNR units, or combination thereof. NNR units may contain different types of data. The type of data that is contained in the payload of an NNR Unit defines the NNR Unit's type. This type is specified in the NNR unit header. The following table specifies the NNR unit header types and their identifiers.

| nnr_unit_type | Identifier | NNR Unit Type | Description |
| --- | --- | --- | --- |
| 0 | NNR_STR | NNR start unit | Compressed neural network bitstream start indicator |
| 1 | NNR_MPS | NNR model parameter set data unit | Neural network global metadata and information |
| 2 | NNR_LPS | NNR layer parameter set data unit | Metadata related to a partial representation of neural network |
| 3 | NNR_TPL | NNR topology data unit | Neural network topology information |
| 4 | NNR_QNT | NNR quantization data unit | Neural network quantization information |
| 5 | NNR_NDU | NNR compressed data unit | Compressed neural network data |
| 6 | NNR_AGG | NNR aggregate unit | NNR unit with payload containing multiple NNR units |
| 7 ... 31 | NNR_RSVD | Reserved | MPEG-reserved range |
| 32 ... 63 | NNR_UNSP | Unspecified | Unspecified range |

NNR unit is data structure for carrying neural network data and related metadata which is compressed or represented using this specification. NNR units carry compressed or uncompressed information about neural network metadata, topology information, complete or partial layer data, filters, kernels, biases, quantization weights, tensors, or the like. An NNR unit may include following data elements:

NNR unit size: This data element signals the total byte size of the NNR Unit, including the NNR unit size.

NNR unit header: This data element contains information about the NNR unit type and related metadata.

NNR unit payload: This data element contains compressed or uncompressed data related to the neural network.

NNR bitstream is composed of a sequence of NNR Units and/or aggregate NNR units. The first NNR unit in an NNR bitstream shall be an NNR start unit (e.g. NNR unit of type NNR_STR).

Neural Network topology information can be carried as NNR units of type NNR_TPL. Compressed NN information can be carried as NNR units of type NNR_NDU. Parameter sets can be carried as NNR units of type NNR_MPS and NNR_LPS. An NNR bitstream is formed by serializing these units.

Image and video codecs may use one or more neural networks at decoder side, either within the decoding loop or as a post-processing step, for both human-targeted and machine targeted compression.

Following paragraphs describe some non-exhaustive examples of possible 'purposes' of these decoder-side neural networks:

Enhancing the quality for human consumption. This may comprise concealment of compression artefacts, for example, ringing and blocking.

Spatial upsampling, sometimes referred to as super-resolution.

Temporal upsampling, or frame-rate upsampling. For example, by interpolating between different frames.

Concealment of transmission errors.

Application of specific perceptual 'effect', for example, bokeh, sharpening, and the like.

Enhancing the accuracy of machine analysis tasks, for example, computer vision tasks. This purpose may be broken into multiple purposes, based on the specific computer vision task:

Enhancing for object detection;

Enhancing for object classification;

Enhancing for image/scene/context classification;

Enhancing for video action or activity classification; and

Enhancing for image or video segmentation.

In the case of video, the neural network operation may be applied separately to each of the frames, separately to some of the frames, jointly to a set of frames, to one or more regions of one or more frame, and the like.

However, there is no standardized way to signal to the decoder side which neural network topology and set of weights to use for a certain encoded image or frame or set of frames.

A mechanism is needed to signal a purpose for neural network (NN) operation in an extensible way and associate a general-purpose NN representation with the indicated purpose.

Various embodiments propose mechanisms for signaling the purpose of one or more neural networks that are associated to one or more image or frames, where the neural networks are to be applied at decoder side. Signaling the purpose of one or more neural networks has multiple benefits, including but not limited to being able to select which neural network among multiple available ones is applicable for the need(s) or task(s) of the client or alike.

In an example embodiment, a solution based on high-level syntax for an SEI message is proposed. The SEI message includes information about the purpose, and the MPEG-NNR bitstream representing the neural network or an update of the neural network.

In another example embodiment, the SEI message may comprise multiple purposes, where the neural networks associated to these purposes share layers.

In yet another embodiment, the SEI message may comprise a persistence scope.

In still another embodiment, the SEI message may comprise indicating pre-defined filters.

Solution Based on SEI Message

In this embodiment, an SEI message (NN SEI) which includes information about the purpose of one or more neural network that can be applied within or outside of the decoding operation is proposed.

Figure 12:
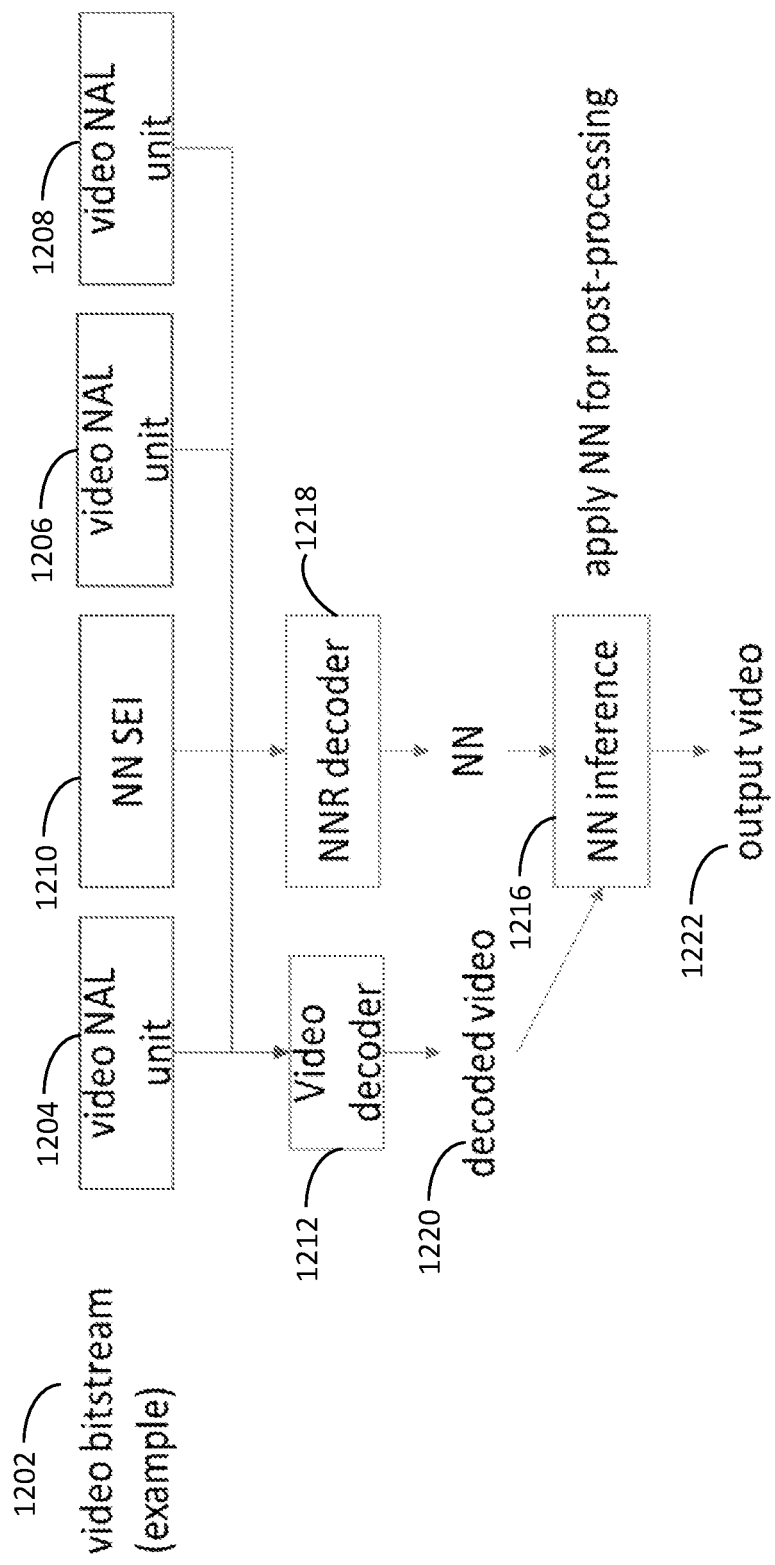
FIG. 12 illustrates an example of operations performed at a decoder side device for enhancing of media frames, in accordance with an embodiment.

FIG. 12 illustrates an example of operations performed at a decoder side device for enhancing of video frames, in accordance with an embodiment. In an embodiment, the enhancing of video frames includes case of post-processing enhancing of video frames. An input video bitstream 1202 may be comprised of video NAL units (for example, video NAL units 1204, 1206, and 1208) and an NN SEI (for example, an NN SEI 1210), where the NN SEI included SEI message proposed in this embodiment. The video NAL units 1204, 1206, and 1208 are decoded by a video decoder 1212, such as a H.266-compliant decoder, and the NN SEI 1210 is first parsed in order to extract the MPEG-NNR bitstream and then a MPEG-NNR-compliant decoder, for example, NNR decoder 1214 is used to decode the NNR bitstream. The decoded neural network (NN) is then used to enhance or filter the decoded video frames which are associated with that NN. For example, an inference module or circuit 1216 may use NN 1218 to enhance or filter decoded frames, from a decoded video 1220, which are associated with NN 1218 to output an output video 1222.

It needs to be understood that an embodiment described with FIG. 12 could likewise be realized with any neural network bitstream, which is not necessarily limited to MPEG-NNR, and the neural network bitstream is decoded with a suitable decoder, which is not necessarily limited to MPEG-NNR-compliant decoder.

An example version of the NN SEI message may include the following structure:

```
sei_container{
    purpose_sei_message( );
    filter_sei_message( );
}
``` where sei_container may e.g. be a filter nesting SEI message or an SEI NAL unit. The sei_container structure may include SEI messages describing one or more filtering operations and related information.

In an embodiment, sei_container( ) is a logical structure, which need not correspond to any syntax structure in a bitstream but just be a collection of structures that logically describe a post-filter. The structures logically contained in a sei_container( ), e.g. purpose_sei_message( ) and filter_sei_message( ) need not appear consecutively in a bitstream. In an embodiment, the structures logically contained in a sei_container( ) comprise an identifier such that when the identifier value is the same in two or more structures, they logically belong to the same sei_container( ). In an embodiment, an encoder includes the same identifier value in two or more SEI messages describing one or more filtering operations and related information to logically map those SEI messages to describe the same one or more filtering operations. In an embodiment, a decoder parses the same identifier value from two or more SEI messages to conclude that those SEI messages describe the same one or more filtering operations.

The SEI message type of purpose_sei_message( ) may be used to identify the purpose of the SEI message content. The payload of the sei_container may be required to contain purpose_sei_message( ) (e.g. as the first SEI message), purpose_sei_message( ) is an SEI message that specifies the purpose for filtering specified within the sei_container( ). The purpose may comprise but is not limited to one or more of purposes listed earlier.

In an embodiment, purpose_sei_message( ) is a logical placeholder for any specific SEI message that defines the purpose. In other words, sei_container( ) comprises such an SEI message in place of purpose_sei_message( ) that specifies the purpose. The payload type value of the SEI message may indicate the purpose and the payload of the SEI message may contain parameters that may further characterize the purpose. According to this embodiment, new purposes may be introduced by defining new SEI messages and multiple purposes for filtering can be indicated by including multiple purpose SEI messages in the same sei_container( ).

In another embodiment, purpose_sei_message is an SEI message whose payload may comprise one or more syntax elements specifying the purpose. In an embodiment, a purpose can be enumerated as a list of known purposes. Such information could be then signalled inside the purpose_sei_message( ).

In yet another embodiment, a purpose may be indicated as an independent syntax element inside the sei_container( ). The syntax element value can be selected among a list of enumerated known purposes.

In an embodiment, if a video decoder (or alike) does not recognize the SEI message type of a contained SEI message, such as the SEI message type of purpose_sei_message( ), it should omit the sei_container( ).

The payload of the sei_container may be required to contain filter_sei_message( ) (e.g. as the second SEI message), which is an SEI message that specifies the filter to be applied, filter_sei_message( ) may for example contain an MPEG-NNR bitstream.

An example of associated syntax for H.266/VVC specification is as follows:

| sei_payload( payloadType, payloadSize ) { | Descriptor |
|---|---|
| if( nal_unit_type == PREFIX_SEI_NUT ) | |
| ... | |
| else if( payloadType == XX1 ) | |
| postprocessing_filter_nesting( payloadSize ) /* Specified in Rec. ITU-T H.274 \| ISO/IEC 23002-7 */ | |
| else if( payloadType == XX2 ) | |

```
sei_payload( payloadType, payloadSize ) {                                                Descriptor
        resampling_filter_info( payloadSize ) /* Specified in Rec. ITU-T H.274 |
ISO/IEC 23002-7 */
        else if( payloadType == XX3 )
            nnr_filter( payloadSize ) /* Specified in ISO/IEC 15938-17 */
    else /* nal_unit_type == SUFFIX_SEI_NUT */
        ...
        else if( payloadType == XX1 )
            postprocessing_filter_nesting( payloadSize ) /* Specified in Rec. ITU-T
H.274 | ISO/IEC 23002-7 */
        ...
    }
}
```

XX1, XX2, and XX3 are constant values, which are intended to be selected during the standardization process. In an embodiment, XX1, XX2 and XX3 values are manually selected. In another embodiment, XX1, XX2 and XX3 values are selected automatically.

postprocessing_filter_nesting( ) is an example of the sei_container structure.

resampling_filter_info( ) is an example of one purpose_sei_message structure, which specifies the purpose to be resampling of output picture(s).

nnr_filter( ) is an example of one filter_sei_message( ), which specifies a neural network as an MPEG-NNR coded bitstream, where the neural network is used as a filter for output picture(s).

In another embodiment, NN data may be stored as a serialized binary data which is compliant with an NN processing framework or exchange format such as, but not limited to, NNEF, ONNX, PyTorch or Tensorflow. filter_sei_message( ) may comprise serialized binary neural network data.

An example of associated syntax for H.274/VSEI specification is as follows:

| postprocessing_filter_nesting( payloadSize ) { | Descriptor |
|---|---|
| ppfn_num_seis_minus2 | ue(v) |
| while( !byte_aligned( ) ) | |
| ppfn_zero_bit /* equal to 0 */ | u(1) |
| for( i = 0; i <= ppfn_num_seis_minus2 + 1; i++ ) | |
| sei_message( ) | |
| } | |

| resampling_filter_info( payloadSize ) { | Descriptor |
|---|---|
| min_scaling_ratio_hor | u(16) |
| min_scaling_ratio_ver | u(16) |
| max_scaling_ratio_hor | u(16) |
| max_scaling_ratio_ver | u(16) |
| } | | ppfn_num_seis_minus2 plus 2 specifies the number of the SEI messages (sei_message( )) nested in this post-processing filter nesting SEI message.

min_scaling_ratio_hor and min_scaling_ratio_ver specifies the minimum horizontal and vertical scaling ratio, respectively, for which this filter is suggested to be applied in 8.8 fixed point representation.

max_scaling_ratio_hor and max_scaling_ratio_ver specify the maximum horizontal and vertical scaling ratio, respectively, for which this filter is suggested to be applied in, for example, 8.8 fixed point representation.

The following pseudo-code shows a filter_container structure that specifies:
- the purpose of the filtering to be resampling within the scaling ratio from 1 (exclusive) to 4 (inclusive) both horizontally and vertically.
- an MPEG-NNR bitstream that specifies the neural network filter to be used for the resampling filtering.

| postprocessing_filter_nesting( payloadSize ) { | Value |
|---|---|
| ppfn_num_seis_minus2 | 0 |
| while( !byte_aligned( ) ) | |
| ppfn_zero_bit /* equal to 0 */ | 0 |
| // for( i = 0; i <= ppfn_num_seis_minus2 + 1; i++ ) | |
| { | |
| // i equal to 0 | |
| resampling_filter_info { | |
| min_scaling_ratio_hor | 257 |
| min_scaling_ratio_ver | 257 |
| max_scaling_ratio_hor | 1024 |
| max_scaling_ratio_ ver | 1024 |
| } | |
| // i equal to 1 | |
| nnr_filter( ) | |
| } | |

In an embodiment, associated gain is signaled using the following conceptual syntax or alike:
sei_container{
    purpose_sei_message( );
    filter_sei_message( );
    gain_sei_message( );
}

The payload of the sei_container may be required to contain also gain_sei_message( ) (e.g. as the third SEI message), which is an SEI message that specifies the expected gain that can be achieved if the neural network signalled in filter_sei_message( ) is applied, where the gain is expressed with respect to one or more predefined metrics that are associated to the purpose specified in the purpose_sei_message( ).

For example, if the purpose is enhancement for scene classification, the gain may be expressed as expected percentage points in classification accuracy.

In another example, if the purpose is visual quality enhancement, the gain may be expressed as expected PSNR improvement, or MS-SSIM improvement.

This way, the decoder side application may decide whether or not to apply the NN based on the expected gain and other factors such as computational complexity of the neural network, available resources of the decoder side devices, and the like.

In an embodiment, instead of signaling the expected gain in gain_sei_message( ), the gain according to any example above may be contained in one or more syntax elements within a purpose_sei_message( ).

Example Embodiments Describing Multiple Purposes, with Shared Layers.

In an embodiment, the following conceptual syntax or alike is used:
```
sei_container{
    purpose_sei_message( );
    purpose_specific_topology_sei_message( );
    filter_sei_message( );
}
``` purpose_sei_message( ) may also specify more than one purpose. In this embodiment, a purpose_specific_topology_sei_message( ) is present in the payload of sei_container( ) (e.g. as the second SEI message) and specifies the subsets of topology of the NN present in filter_sei_message( ) that perform the purposes specified in purpose_sei_message( ).

For example, if there are two purposes, such as segmentation and quality enhancement, purpose_specific_topology_sei_message( ) may specify two subsets of the NN topology, where one subset is a list of layers for performing segmentation, and another subset is a list of layers for performing quality enhancement. The two subsets may share some of the NN layers.

In an embodiment, a purpose_specific_topology_sei_message( ) specifies a subset of the NN topology that applies to a single purpose. The order of the SEI messages within the sei_container( ) may determine the purpose that is associated with the purpose_specific_topology_sei_message( ). For example, the purpose_sei_message( ) that immediately precedes the purpose_specific_topology_sei_message( ) may contain the purpose to which the subset of the NN topology applies.

In an embodiment, a subset of the NN topology, if any, is specified by zero or more syntax elements in purpose_sei_message( ).

In an embodiment, a common subset of topology for all indicated purposes is signaled e.g. in common_topology_sei_message( ) contained in the sei_container( ). The common subset of the topology may, for example, be indicated as a list of layers. In addition, purpose-specific subsets of topology may be signaled for none, some, or all indicated purposes.

In an embodiment, when more than one purpose is indicated in the sei_container( ) (e.g., by having multiple instances of purpose_sei_message( ) or by including multiple purposes in a single purpose_sei_message( )), the filter_sei_message( ) may contain a neural network representation which has a common subset of layers and purpose-specific subsets of layers. For example, the first few layers are the common subset and the following layers represent purpose-specific subset of layers, arranged as parallel branches which branch-out from the last layer in the common subset of layers. A neural network which can be used for both segmentation and quality enhancement could for example have an initial common subset of layers, followed by two branches. The output of two branches represents the segmentation and the quality enhancement results.

Example Embodiments Indicating a Persistence Scope.

In an embodiment, the following conceptual syntax or alike is used:
```
sei_container{
    purpose_sei_message( );
    filter_sei_message( );
    scope_sei_message( );
}
```

The payload of the sei_container may be required to contain an SEI message (e.g. as the third SEI message) that specifies the scope within which the filter is valid. The scope may be expressed, for example, as:
- a picture order count (POC) range relative to the POC value of the picture unit containing the SEI message;
- a temporal duration;
- a number of frames; or
- a spatial scope, which indicates the areas within one or more frames for which the filter is valid. In this case, the temporal scope is assumed to be known at the decoder side. The spatial scope may be a list or set of spatial coordinates with respect to a predefined coordinate system.
- a spatio-temporal scope where both region coordinates within frame(s) and temporal duration (or alike) are specified.

In some embodiments, the temporal or spatio-temporal scope may refer to non-connected portions of the video, for example, a filter may be applied from frame 1 to frame 150 and from frame 400 to frame 470.

Another Example Embodiment Indicating a Persistence Scope

The sei_container( ) contains an identifier for a specific neural network (e.g. ppfn_id). A filter activation SEI message can include a ppfn_id value that is activated for a temporal scope, spatial scope or spatio-temporal scope determined by the filter activation SEI message. The filter with a particular ppfn_id value can be overwritten or updated by a subsequent sei_container( ) containing that ppfn_id value.

In an embodiment, a filter activation SEI message is sent outside sei_container( ) and may contain an identifier. The identifier value associates the filter activation SEI message with a filter SEI message with same identifier value.

In an embodiment, a filter activation SEI message or alike may include an index or an identifier of a neural network update that the SEI message activates.

A filter activation SEI message enables delivery of the neural network and/or an update of a neural network in or along picture units preceding, in decoding order, the picture where the (updated) neural network is taken into use. Thus, a filter activation SEI message is helpful to provide sufficient initialization time for an entity performing the neural network inference to switch from one NN to another or to update the parameters of an existing one.

Yet Another Example Embodiment Indicating a Persistence Scope

In an example, the scope pertains valid from the position of the sei_container structure until a specific 'event' appears in the bitstream, which may e.g. be one or more of the following:
- the end of a coded video sequence (for a single-layer bitstream) or the end of a coded layer video sequence (for a multi-layer bitstream);
- another sei_container structure appears; or
- another sei_container structure or other signal indicating that the previous sei_container structure is canceled.

When more than one 'event' type may be possible, the sei_container( ) is valid until the next event, regardless of its type. For example, the sei_container( ) may be valid until the end of the coded layer video sequence or a subsequent sei_container( ), whichever is next in the bitstream.

sei_container may include a 'cancel flag' that turns off filtering.

In an embodiment, prerequisites for applying the filtering are signaled using the following conceptual syntax or alike:

```
sei_container{
  purpose_sei_message( );
  filter_sei_message( );
  prerequisite_sei_message( );
}
```

The payload of the sei_container may comprise a prerequisite_sei_message( ), which is an SEI message that specifies the prerequisites for applying the filtering in in filter_sei_message( ). Prerequisites may comprise properties of the playback device (e.g. ambient light intensity, screen brightness, contrast, pixel density or resolution and alike).

For example, if filtering is to be applied only for certain display resolutions, the prerequisite_sei_message( ) may contain the resolution range for which the filtering is valid.

In an embodiment, instead of signaling the prerequisites in prerequisite_sei_message( ), the prerequisites may be included in one or more syntax elements within a purpose_sei_message( ).

In an embodiment, essentiality of one or more prerequisites may be signaled. For example, it may be signaled that a prerequisite must be fulfilled in order to apply the filtering. In another example, it may be signaled that a prerequisite is recommended to be fulfilled in order to apply the filtering.

In an embodiment, a prerequisite_sei_message( ) or any similar structure comprises a complexity requirement, such as, but not limited to, one or more of the following: a memory (such as number of bytes) needed to store the neural network, a memory (such as number of bytes) needed to temporarily store a decompressed version of the neural network on a temporary memory device such as a Random-Access Memory (RAM), a memory (such as number of bytes) needed to temporarily store a decompressed version of the neural network and intermediate data that is passed on a temporary memory device such as a Random-Access Memory (RAM), a number of layers in a neural network, a number of weights in the neural network, a number of connections in the neural network. The complexity requirement values may be quantized, where the quantization may be uniform or non-uniform.

In an embodiment, a complexity requirement for a prerequisite_sei_message( ) or any similar structure comprises one or more measures for operations needed for inference of the neural network. A measure may be for example a value indicating a number of atomic operations, such as multiplications and/or additions, per sample. A measure may indicate a limit that may be, but is not necessarily, required and is not exceeded by the inference of the neural network, a maximum that is required by the inference of the neural network, or an average that is required by the inference of the neural network. A window for deriving a measure may be indicated with the complexity requirement in a prerequisite_sei_message( ) or any similar structure. A window may for example be a picture or a random access period.

In an embodiment, a prerequisite_sei_message( ) or input_format_sei_message( ) or alike indicates the picture format to be used as input for the neural network inference, which may comprise but is not limited to one or more of the following:
  color primaries, e.g. YCbCr, YCgCo, RGB, GBR, YZX, or XYZ;
  chroma format (e.g. monochrome, 4:2:0, 4:2:2, 4:4:4), bit depth (which may be common for all color components or indicated color-component-wise);
  picture width and height in samples;
  width and height of an effective area, such as a conformance cropping window, within a picture;
  patch width and height in samples for a single neural network inference process;
  color component ordering (e.g. planar or sample-wise interleaved);
  boundary padding mode specifying the padding method to be applied to the patch, when the picture size is not an integer multiple of the patch size (e.g. repeat a picture boundary pixel horizontally and vertically, or wraparound from the right edge of the picture to the left edge, which may be applicable to panoramic images);
  number of input pictures for a neural network inference.
  a normalization mode to be applied to one or more frames that are input to the neural network. One example of normalization mode is a normalization whose result is a normalized frame which has a mean value of zero and a variance value of one.
  normalizing values, to be used in order to normalize one or more frames that are input to the neural network, according to the normalization mode. For example, a mean value and a standard deviation value.

In an embodiment, an output_format_sei_message( ) or alike indicates the picture format resulting from the neural network inference, which may comprise but is not limited to one or more of the parameters listed above for input_format_sei_message( ).

In an embodiment, a scaling factor flag message, for example, a scaling_factor_flag_sei_message( ) or alike indicates whether the output of the neural network filter is to be scaled. If the flag is set to one, the output of the neural network filter is to be scaled. The scaling operation may comprise multiplying the output of the neural network filter by one or more scaling factors. In one example, the Y, U and V components of a YUV frame that are output by a neural network filter may be scaled by three scaling factors, where each scaling factor sales one of the YUV components. In another example, the Y, U and V components of YUV frame that are output by a neural network filter may be scaled by the same scaling factor.

In an embodiment, a scaling factor message, for example, a scaling_factor_sei_message( ) or alike specifies one or more values to be used for scaling the output of the neural network filter, when the scaling_factor_flag_sei_message( ) indicates that the output of the neural network filter is to be scaled. In another embodiment, the scaling factor flag message may include the one or more values to be used to scale the output of the one or more NNs In an embodiment, a residual filtering flag message, for example, a residual_filtering_flag_sei_message( ) or alike indicates whether the output of the neural network filter is to be added to the input of the neural network filter. If the flag is set to one, the output of the neural network filter is to be added to the input of the neural network filter, and the frame resulting from the addition operation represents the final output of the filtering process. If the scaling_factor_flag_sei_message( ) is set to one, and residual_filtering_flag_sei_message( ) is set to one, the scaling operation indicated by scaling_factor_flag_sei_message( ) may be performed before the addition operation indicated by residual_filtering_flag_sei_message( )

Still Another Example Embodiment Indicating Pre-Defined Filters

Some neural networks may be de-facto standards for certain purposes or may be selected by a standards-defining organization. For example, an upcoming MPEG Video Coding for Machines standard may define a standard neural network for enhancing decoded frames for an action recognition purpose.

A neural network may be made accessible separately from a video bitstream for which the neural network is applied e.g. for enhancing the decoded pictures reconstructed by decoding the video bitstream. For example, the neural network may be obtained through a Uniform Resource Locator (URL). For example, a Hypertext Transfer Protocol (HTTP) URL for an NNR bitstream may be provided, and a client may request the NNR bitstream by issuing an HTTP GET request for the URL.

It may be beneficial to indicate that a particular (de-facto) standard neural network or a separately provided neural network is in use, rather than having a complete NNR representation of it in the video bitstream.

In an embodiment, the payload of the sei_container( ) comprises an SEI message, which identifies a (de-facto) standard neural network or a separately provided neural network through a reference, such as a Uniform Resource Identifier (URI) (which may be a URL), a universally unique identifier (UUID), or one or more indexes to pre-defined list(s) of known or pre-defined neural networks. Alternatively, the syntax of the SEI message can comprise an NNR bitstream that references an externally specified NN (e.g. NNEF or ONNX). In an embodiment, the sei_container may contain a filter_sei_message( ) whose type identifies that it contains an identifier of a neural network. In an embodiment, an identifier of the neural network is accompanied by a media type (e.g. MIME type) of the neural network in the SEI message. In an embodiment, the identifier and/or the media type of the neural network are directly included in the sei_container as syntax element(s) rather than contained in an SEI message within the sei_container( ).

In an embodiment, a client or alike decodes a sei_container( ) from or along a video bitstream, wherein the decoding comprises decoding one or more purposes and decoding an identifier of a neural network. The client or alike concludes that the one or more purposes are applicable to its needs or tasks. In response to this conclusion, the client or alike fetches the neural network that is identified by the identifier, unless the client or alike already has access to that neural network. Furthermore, in response to this conclusion, the client or alike uses the identified neural network for filtering decoded pictures of the video bitstream.

In addition, it may be beneficial to update the de-facto standard NN or the separately provided neural network, e.g. so that it adapts to the content of the video bitstream. In an embodiment, sei_container( ) comprises both i) an SEI message, which identifies a (de-facto) standard neural network or a separately provided neural network through a reference and ii) an update to the identified neural network.

In an embodiment, an update of the neural network is represented by NNR. For example, MPEG NNR version 2 may be used, since MPEG NNR version 2 focuses on compressing weight-updates.

In an embodiment, an update of the neural network is relative to a base neural network, which may be identified e.g. by a URI or represented by NNR.

In an embodiment, an update of the neural network with a particular identifier value is relative to the previous neural network with the same identifier value and is "in force". For example, a first update of the neural network updates the base neural network to a first neural network, and a second update of the neural network updates the first neural network to the second neural network, and so on.

In an embodiment, an encoder indicates in or along the update of the neural network whether the update is relative to a base neural network or a previous neural network with the same identifier value. For example, an SEI message comprising the filter update (e.g. called filter_sei_message( )) may comprise a flag indicating whether the base neural network or a previous neural network with the same identifier value is updated. In an embodiment, a decoder decodes from or along the update of the neural network whether the update is relative to a base neural network or a previous neural network with the same identifier value and updates the indicated neural network accordingly.

In an embodiment, the previous neural network is the latest previous neural network, i.e. the neural network that is "in force". In another embodiment, an encoder indicates in or along the update of the neural network which previous neural network an update of the neural network with a particular identifier value is relative to. An indication may for example be an index that corresponds to enumerated neural network updates since the previous base neural network with the same identifier value in the bitstream. In an embodiment, a decoder decodes from or along the update of the neural network which previous neural network an update of the neural network with a particular identifier value is relative to and updates the indicated neural network accordingly.

An Example Implementation is Described Below:
    Add within sei_container( ) another SEI message that specifies which (de-facto) standard NN is used
      sei_container{
        purpose_sei_message( );
        base_filter_message( );
        filter_sei_message( );
      }
    The SEI message base_filter_message( ) can contain e.g. a UTF8 character string specifying a URI, which identifies the (de-facto) standard NN or a neural network provided separately from the video bitstream.

Another Example Implementation is Described Below:
    In an embodiment, syntax element(s) in sei_container( ) or in filter_sei_message( ) specify which (de-facto) standard NN or separately provided neural network is used. The syntax element can be e.g. a UTF8 character string specifying a URI, which identifies the (de-facto) standard NN or a separately provided neural network. When null, no 'base' filter is provided through the URI, and the filter_sei_message( ) contains the entire neural network. Alternatively, the syntax can be an NNR bitstream that references an externally specified NN (e.g. NNEF or ONNX).

Yet Another Example Implementation is Described Below:
    In sei_container( ), there could be a flag or 'gating' to indicate the selection of a pre-defined filter or a filter_sei_message( ). However, this may be less extensible than just inferring the operation from the presence of base_filter_message( ) and/or filter_sei_message( ).

Embodiments Related to Sei_Container( ) being a Logical Structure

In an embodiment, an NNR post-filter SEI message contains an NNR bitstream. The NNR bitstream may provide an entire neural network or may update some parameters of a neural network that is identified by a Uniform Resource Identifier or provided as an NNR bitstream previously. The NNR post-filter SEI message has an identifier that identifies the post-filter. Examples of syntax and semantics suitable for this embodiment are provided in the next paragraphs, but it needs to be understood that this embodiment could be realized with different syntax and semantics too. For example, the nnrpf_mode_idc in the example syntax has four possible values, but it needs to be understood that the embodiment could be similarly realized with a different number of nnrpf_mode_idc values, e.g. by excluding the option to provide a base neural network through a URI. Similarly, in an example, nnrpf_persistence_flag could be excluded and the NNR post-filter SEI message could be specified to apply for one or more pictures similarly to the conditions of implied by nnrpf_persistence_flag equal to 1.

Syntax and Semantics for NNR Post-Filter SEI Message

| nnr_post_filter( payloadSize ) { | Descriptor |
|---|---|
| nnrpf_id | u(21) |
| nnrpf_mode_idc | u(2) |
| if( nnrpf_mode_idc > 0 ) | |
|   nnrpf_persistence_flag | u(1) |
| if( nnrpf_mode_idc == 1 ) { | |
|   i = 0 | |
|   do { | |
|     nnrpf_uri[ i ] | b(8) |
|   while( nnrpf_uri[ i++ ] != 0 ) | |
| } | |
| if( nnrpf_mode_idc == 2 \|\| nnrpf_mode_idc == 3 ) { | |
|   for( i = 0; i < payloadSize − 3 ; i++ ) | |
|     nnrpf_payload_byte[ i ] | b(8) |
| } | |
| } | |

This SEI message either specifies a neural network that may be used as a post-processing filter or cancels the persistence of the previous post-processing filter with the same identifier value (e.g., the same value of nnrpf_id).

nnrpf_id contains an identifying number that may be used to identify a post-processing filter.

Values of nnrpf_id from 0 to $2^{20}-1$, inclusive, may be used as determined by the application. Values of nnrpf_id from $2^{20}$ to $2^{21}-1$, inclusive, are reserved for future use.

nnrpf_mode_idc equal to 0 indicates that no post-processing filter associated with the nnrpf_id value is specified in this SEI message (and stops the persistence of post-processing filter with the same nnrpf_id value indicated in previous NNR post-filter SEI messages in decoding order, if any). nnrpf_mode_idc equal to 1 specifies that the post-processing filter associated with the nnrpf_id value is a neural network identified by a given Uniform Resource Identifier (URI). nnrpf_mode_idc equal to 2 specifies that the post-processing filter associated with the nnrpf_id value is a neural network represented by a neural network bitstream (e.g. ISO/IEC 15938-17 bitstream) contained in this SEI message. nnrpf_mode_idc equal to 3 specifies that the post-processing filter is the neural network identified by the previous NNR post-filter SEI message, in decoding order, with nnrpf_mode_idc equal to 1 or 2 and updated by the neural network bitstream (e.g. ISO/IEC 15938-17 bitstream) contained in this SEI message.

nnrpf_persistence_flag specifies the persistence of this SEI message for the current layer.

nnrpf_persistence_flag equal to 0 specifies that the this SEI message applies to the current decoded picture only.

nnrpf_persistence_flag equal to 1 specifies that this SEI message applies to the current decoded picture and all subsequent decoded pictures of the current layer, in output order, until one or more of the following conditions are true:

A new coded layer video sequence (CLVS) of the current layer begins.

The bitstream ends.

This SEI message has nnrpf_mode_idc equal to 1 or 2 and Aa picture that follows the current picture in output order and is associated with a NNR post-filter SEI message with the same nnrpf_id value as that in this SEI message and nnrpf_mode_idc value equal to 0, 1, or 2 is output.

This SEI message has nnrpf_mode_idc equal to 3 and a picture that follows the current picture in output order and is associated with a NNR post-filter SEI message with the same nnrpf_id value as that in this SEI message and any nnrpf_mode_idc value is output.

The neural network that may be used as a post-processing filter for a cropped decoded output picture is the filter that i) is identified by the NNR post-filter SEI message that has a particular nnrpf_id value, has nnrpf_mode_idc equal to 1 or 2, and pertains to the picture and ii) is updated by the NNR post-filter SEI message, if any, that has the same nnrpf_id value, has nnrpf_mode_idc equal to 3, and pertains to the picture.

nnrpf_uri[i] contains the i-th byte of a NULL-terminated UTF-8 character string that contains a URI identifying the neural network used as the post-processing filter.

nnrpf_payload_byte[i] contains the i-th byte of a bitstream conforming to ISO/IEC 15938-17. The byte sequence nnrpf_payload_byte[i] for all values of i in the range of 0 to payloadSize−3, inclusive, shall be a complete bitstream that conforms to ISO/IEC 15938-17.

In an embodiment, a post-filter purpose SEI message specifies a purpose for the post-filter, which may be e.g. quality enhancement or super resolution. The post-filter purpose SEI message has an identifier that identifies the post-filter. When the identifiers in the post-filter purpose SEI message and the NNR post-filter SEI message have the same value, the SEI messages are logically in the same sei_container( ) structure and describe the same post-filter. Examples of syntax and semantics suitable for this embodiment are provided in the next paragraphs, but it needs to be understood that this embodiment could be realized with different syntax and semantics too.

Syntax and Semantics for Post-Filter Purpose SEI Message—Table 1

| post_filter_purpose( payloadSize ) { | Descriptor |
|---|---|
| pfp_id | u(21) |
| pfp_purpose | ue(v) |
| if( pfp_purpose == 1 ) { /* super resolution */ | |
|   pfp_pic_width_in_luma_samples | ue(v) |
|   pfp_pic_height_in_luma_samples | ue(v) |
| } | |
| } | |

This SEI message may be used for indicating a purpose for the identified post-processing filter. The identified post-processing filter is specified by the NNR post-filter SEI message that has nnrpf_id equal to the value of pfp_id.

In some embodiments, other mechanisms, such as another post-filter SEI message, may be specified. The value of pfp_id could be used as an identification number for the post-processing filter specified through such other mechanism. If there is another post-filter SEI message, e.g. for ALF or another neural network representation than NNR, such a post-filter SEI message can similarly be associated with the post-filter purpose SEI message through having an identifier value equal to the pfp_id value.

This SEI message applies to the current decoded picture and all subsequent decoded pictures of the current layer, in output order, until one or more of the following conditions are true:

A new coded layer video sequence of the current layer begins.

The bitstream ends.

pfp_id contains an identifying number used to identify a post-processing filter.

Values of pfp_id from 0 to $2^{20}-1$, inclusive, may be used as determined by the application. Values of pfp_id from $2^{20}$ to $2^{21}-1$, inclusive, are reserved for future use.

pfp_purpose indicates the purpose of post-processing filter identified by pfp_id as specified in Table 2. The value of pfp_purpose may be required to be within a certain value range, such as the range of 0 to $2^{32}-2$, inclusive, which may be beneficial to limit the storage of the decoded value to a 32-bit integer. Values of pfp_purpose that do not appear in Table 2 are reserved for future use. Decoders conforming to Table 2 may ignore post-filter purpose SEI messages that contain reserved values of pfp_purpose.

Definition of pfp_purpose—Table 2

| Value | Interpretation |
|---|---|
| 0 | Visual quality improvement |
| 1 | Increase the width or height of cropped decoded output picture | pfp_pic_width_in_luma_samples and pfp_pic_height_in_luma_samples, when present, specify the width and height, respectively, of the luma sample array of the picture resulting by applying the post-processing filter identified by pfp_id to a cropped decoded output picture.

In an embodiment, when a reserved value of pfp_purpose is taken into use in the future, the syntax of this SEI message could be extended with syntax elements whose presence is conditioned by pfp_purpose being equal to that value.

Embodiment Related to Sei Container( ) being an SEI NAL Unit

This embodiment is described with reference to the syntax and semantics above. In an embodiment, an encoder encodes an SEI NAL unit that contains both a post-filter purpose SEI message and an NNR post-filter SEI message, where the value of nnrpf_id is equal to the value of pfp_id. It may be a required encoder operation that when a post-filter purpose SEI message and an NNR post-filter SEI message with nnrpf_id equal to pfp_id are present in the same picture unit, they shall be present in the same SEI NAL unit.

Embodiments on Indicating Post-Filter Related Bitstreams Properties and/or Encoder Capabilities and/or Decoder Preferences or Requirements In an embodiment, an entity, such as an encoder, a file writer, a server, a media mixer, a conference control unit, or alike, creates one or more SEI prefix indications in or along a video bitstream, wherein the SEI prefix indication(s) comprise an initial part or an entire syntax structure of sei_container( ) or initial part(s) of or entire syntax structure(s) of one or more syntax structures that sei_container( ) contains. For example, the SEI prefix indication(s) may comprise an initial part or an entire syntax structure of a purpose_sei_message( ) and an initial part or an entire syntax structure of an SEI message that identifies a (de-facto) standard neural network or a separately provided neural network through a reference.

In an embodiment, a SEI prefix indication is a SEI manifest SEI message comprising one or more SEI prefix indication SEI messages.

In an embodiment, a SEI prefix indication is a SEI prefix indication SEI message.

In an embodiment, a SEI prefix indication comprises an indicated number of initial bytes of any SEI message. For example, it may be allowed that a sprop-sei parameter or alike contains a base64 string that represents either initial bytes or an entire SEI message.

In an embodiment, an entity creates one or more SEI prefix indications in or along a video bitstream to declare post-filter related properties of the bitstream. Such declarative indications may be used by clients or alike when selecting a bitstream to be received and/or decoded among bitstreams having different post-filter related properties.

In an embodiment, an entity (e.g. an encoder, a file writer, a sender, a server, a media mixer, or a conference control unit) creates one or more SEI prefix indications to indicate a capability to create a bitstream with the indicated post-filter related properties. Such capability indications may be interpreted to by clients or alike when selecting preferred capabilities for the bitstream to be received. For example, a capability of a sender may be indicated in an SDP offer to a receiver.

In an embodiment, an entity (e.g. a decoder, a file reader, a receiver, a media mixer, or a conference control unit) creates one or more SEI prefix indications to indicate a preference or a requirement on post-filter related properties for a bitstream to be received. Such preference or requirement indications may be interpreted to by senders or alike when encoding for the bitstream to be transmitted. For example, a capability of a receiver may be indicated in an SDP answer to a sender.

In an embodiment, an entity makes one or more SEI prefix indications available along a video bitstream, e.g. in a media description, such as SDP or DASH MPD. An SEI prefix indication may comprise a SEI prefix indication SEI message or may comprise an initial part or an entire syntax structure of one or more SEI messages, such as a post-filter related SEI messages. An SEI prefix indication may be, but is not limited to, one or more of the following:

One or more MIME media parameters. The MIME media parameter(s) may be encapsulated in an SDP parameter or in an attribute of a streaming manifest (e.g. DASH MPD) or alike. Separate or same MIME media parameter(s) may be used for declarative bitstream properties, encoding capabilities, and/or preferences or requirements for bitstream to be decoded.

One or more attributes, parameters, or alike of the media description. An attribute may for example be an attribute in DASH MPD.

One or more syntax elements or syntax structures in a file encapsulating a bitstream.

Below, some embodiments are described with reference to an initial part of sei_container( ). Rather than an initial part of sei_container( ), the embodiments apply similarly to one or more initial parts of or entire syntax structures that may be contained in sei_container( ).

In an embodiment, an encoder, a file writer, or alike creates a SEI prefix indication SEI message or alike in or along a video bitstream. The SEI prefix indication SEI message or alike contains an initial part of the content of sei_container( ) that is also in or along the same video bitstream. The SEI prefix indication SEI message or alike may include, for example, the instance(s) of purpose_sei_message( ) and/or the instance(s) of prerequisite_sei_message(s) of the sei_container( ) and/or the instance(s) of base_filter_message( ).

In an embodiment, a file writer or alike encapsulates a video bitstream that contains one or more sei_container( ) structures into a file that conforms to the ISO base media file format. File format storage options for storing either or both of i) SEI prefix indication SEI message(s) or alike that contain an initial part of sei_container( ) and ii) the sei_container( ) structures may include one or more of the following:

Sample Entry. In this option, NN(s) are stored to metadata storage location of the file, e.g. in a MovieBox.

Non-VCL track samples. For enabling random access in playback, sync samples should be aligned among video track(s) containing data of the video bitstream and the non-VCL track. The same non-VCL track can be applied to different video tracks storing data of the same video bitstream or different video bitstreams via track referencing ('tref').

Samples of one or more video tracks containing data of the video bitstream.

In an embodiment, an entity (e.g. an encoder, a file writer, a sender, a server, a media mixer, or a conference control unit) includes one or more SEI prefix indications along a video bitstream, the SEI prefix indication(s) or alike containing an initial part or an entire syntax structure of a purpose_sei_message( ) and an initial part or an entire syntax structure of one or both of prerequisite_sei_message( ) and an SEI message that identifies a (de-facto) standard neural network or a separately provided neural network through a reference. Such SEI prefix indications enable clients or alike to determine the purpose of post-filtering and identify the neural network for post-filtering in order to determine whether the indicated purpose is preferred by the client or alike and whether the indicated neural network is supported by the client or alike.

In an embodiment, an entity (e.g. an decoder, a file reader, a receiver, a client, a media mixer, or a conference control unit) parses one or more SEI prefix indications along a video bitstream. SEI prefix indication(s) or alike may contain, and the entity parses, one or more of the following combinations:

an initial part or an entire syntax structure of a purpose_sei_message( )

an initial part or an entire syntax structure of one or both of prerequisite_sei_message( ) and an SEI message that identifies a (de-facto) standard neural network or a separately provided neural network through a reference.

The entity determines which combination(s) have a purpose suitable for the operation of the entity and can be executed by the entity (in terms of computational and/or other resources). In an embodiment, the entity indicates its preference or requirement in a SEI prefix indication and transmits the indication.

In an embodiment, a client or alike (e.g. a decoder, a file reader, or a player) obtains a SEI prefix indication SEI message or alike from or along a video bitstream, the SEI prefix indication SEI message or alike containing an initial part of the content of sei_container( ) that is also in or along the same video bitstream. The client or alike decodes the SEI prefix indication SEI message or alike. Based on the decoded SEI prefix indication SEI message or alike, the client or alike decides one or more of the following: i) whether to fetch the video bitstream, ii) which sei_container( ) structures are fetched (if any), iii) which NN(s) referenced by sei_container( ) structure(s) are fetched. For example, a SEI prefix indication SEI message or alike may be obtained from an Initialization Segment of a Representation of a non-VCL track that contains sei_container( ) structures for a particular purpose. If the purpose indicated in the SEI prefix indication SEI message or alike matches the client's need or task, the client may determine to fetch the Representation of the non-VCL track that contains the respective sei_container( ) structures.

Signaling the purpose of one or more neural networks has multiple benefits, including but not limited to i) being able to select which neural network among multiple available ones is applicable for the need(s) or task(s) of the client or alike; ii) fetching only selected neural network(s) among multiple available ones, thus reducing the required network bandwidth and transmission time for obtaining the needed neural network(s); iii) executing the inference only for the selected neural network(s), thus reducing computations and power consumption.

Embodiments Describing In-Loop Decoding Dependency

The following embodiments involve a normative decoding dependency, and can be used when the neural network is within the decoding loop, in either end-to-end learned codec or a NN-enhanced conventional codec (such as H.266/VVC with a NN in-loop filter, also may be referred as a hybrid codec approach).

In an embodiment, a dedicated NAL unit including information, as described above in one or more SEI-based embodiments, is proposed.

Figure 13:
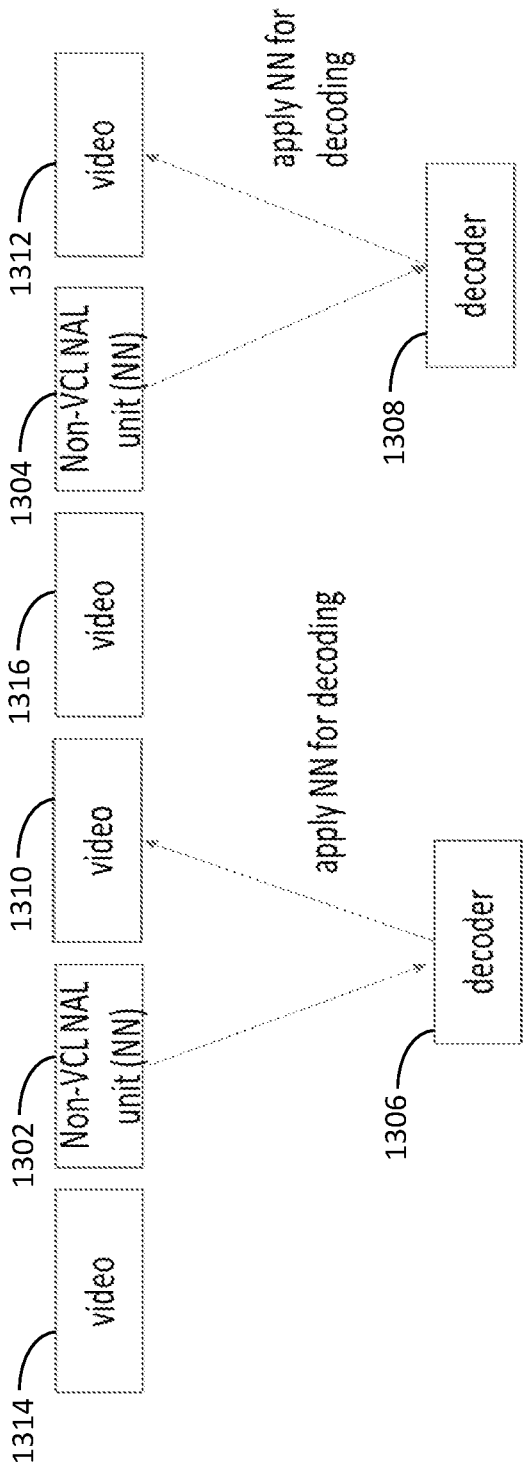
FIG. 13 illustrates a media bitstream in accordance with normative decoding dependency, in accordance with an embodiment.

Referring to FIG. 13, it illustrates a video bitstream in accordance with normative decoding dependency, in accordance with an embodiment. The neural network is signaled within the video bitstream, for example inside non-VCL NAL units 1302 and 1304, for example named NN NAL units. The neural network (or an update of a neural network) is extracted from a NN NAL unit and used to decode one or more units of video bitstream 1310, 1312, such as VCL NAL units or coded video frames, using one or more decoders, for example, decoders 1306 and 1308 to get decoded video. Video 1316 and 1316 may be decoded using a 'default' decoder configuration, for example by using the pretrained neural network, or by using the latest updated neural network (it depends on the persistence scope of the previously signaled NN or NN update).

Embodiments described for SEI message(s) apply similarly to the NN NAL unit too. The NN NAL unit may be regarded as, or may comprise, the sei_container( ) structure in its entirety or partly in different embodiments, and the SEI NAL units contained in sei_container( ) may be called differently but may have similar structure. When an NN NAL unit is in use, the filtering performed by the NN NAL unit may be considered mandatory for decoders and may be used to filter decoded pictures that may be subsequently used as reference pictures for predicting other pictures. In addition to or instead of filtering, the NN NAL units may specify other neural network based decoding operations, such as intra prediction, inter prediction, or transform.

Several NNs may be possible in embodiments. If several NNs are or may be present, an NN may need to be identified or addressed separately or explicitly (e.g. through IDs) so that a correct NN is used in a decoding operation.

The validity of a NN NAL unit may be defined similarly to parameter sets. A NN NAL unit should be available to the decoder before being referenced.

In an embodiment, the NN may be signalled as part of a parameter set. For example, a new APS (adaptation parameter set) type may be defined for a video coding standard such as VVC. In other words, an NN NAL unit may be an adaptation parameter set NAL unit with an APS type indicating NN filtering. In an example embodiment, the following syntax may be used for an APS:

| adaptation_parameter_set_rbsp( ) { | Descriptor |
|---|---|
| aps_params_type | u(3) |
| aps_adaptation_parameter_set_id | u(5) |
| aps_chroma_present_flag | u(1) |
| if( aps_params_type == ALF_APS ) | |
|   alf_data( ) | |
| else if( aps_params_type == LMCS_APS ) | |
|   lmcs_data( ) | |
| else if( aps_params_type == SCALING_APS ) | |
|   scaling_list_data( ) | |
| else if( aps_params_type == NN_APS ) | |
|   nn_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

NN_APS may be a pre-defined constant value, e.g. equal to 3.

In an embodiment, nn_data( ) is an NNR bitstream.

In an embodiment, nn_data( ) has syntax, semantics and child syntax structures like those of sei_container( ). However, it should be noticed that the syntax structures within nn_data( ) do not necessarily comply with the SEI message syntax.

In an embodiment, nn_data( ) comprises syntax and semantics like those of filter_sei_message( ), although it should be noticed that the syntax structures within nn_data( ) do not necessarily comply with the SEI message syntax.

In an embodiment, nn_data( ) comprises syntax and semantics comprising a combination of base_filter_message( ) and filter_sei_message( ), although it should be noticed that the syntax structures within nn_data( ) do not necessarily comply with the SEI message syntax. In this embodiment, a the nn_data( ) may comprise one or both of a reference or an identifier, such as a URI, that identifies a (de-facto) standard neural network or a separately provided neural network, and an update of the identified neural network.

APSs have IDs, thus it is possible to refer to a previous APS. However, APS as specified in VVC does not allow partial updates or predictively coded updates, but rather an APS of a particular type and ID always overrides the previous APS with the same type and ID.

In an embodiment, one or more NNs that are or may be applied for decoding are indicated through their identifiers or alike, such as APS IDs, in a syntax structure of video bitstream, such as a slice header, a picture header, or a picture parameter set. The scope of the syntax structure may define the parts of the video for which the one or more NNs are or may be applied. For example, when one or more NN identifiers are included in a slice header, they respective one or more NNs are or may be applied for the respective slice. When more than one NN is indicated to be applicable, the selection which NN is applied may be performed block-wise, such as CTU-wise in H.266/VVC. An encoder may encode block-wise, into the bitstream, an entropy-coded index to the list of NNs (whose IDs are listed e.g. in a slice header), and respectively a decoder may decode block-wise, from the bitstream, an entropy-coded index to the list of identified NNs.

In an embodiment, a file writer or alike encapsulates a video bitstream that contains NN APS(s) into a file that conforms to the ISO base media file format. File format storage options for APS based NN signaling may include one or more of the following:

Sample Entry. In this option, NN(s) are stored to metadata storage location of the file, i.e. in the MovieBox.

Non-VCL track samples. For enabling random access in playback, sync samples should be aligned among video track(s) containing data of the video bitstream and the non-VCL track. The same non-VCL track can be applied to different video tracks storing data of the same video bitstream or different video bitstreams via track referencing ('tref').

Samples of one or more video tracks containing data of the video bitstream.

NN data may be stored in the NNR bitstream syntax format, which is a serialized stream of NNR units as defined in MPEG specification ISO/IEC 15938-17, for example:

Compressed neural network bitstream in the form of NNR units, also containing specific NNR units that carry the neural network topology information.

Compressed neural network bitstream in the form of NNR units, also containing specific NNR units that reference the neural network topology information as external reference such as a URL/URI, ID or alike. Such an ID may be defined or specified and enumerated in another specification or known information source(specification, web service, web page, AP and alike).

In an example, in NNR units of type MPS or similar parameter set related NNR units, the neural network and related parameters with a single unique ID that represents the NN and flags for default parameter usage can be signaled, which could be like a codebook. The contents of the MPS in such a signaling can be as in the following syntax example where:

mps_NN_enum_id may signal the enumeration id of the NN being utilized. This id may be defined and signaled by another information source (e.g. another specification, a web service, a web page or resource, an SEI message, etc.)

mps_NN_default_params_flag may signal the utilization of default configuration parameters for the NN NN_params( ) may contain non-default configuration parameters NN_params_enum_id may indicate an enumeration id, a URI/URL or any unique identifier for the NN and/or NN parameters so that signaling only this enumeration may be sufficient to configure the NN.

The other syntax elements are as defined in ISO/IEC 15938-17 specification.

| nnr_model_parameter_set_payload( ) { | Descriptor |
|---|---|
| topology_carriage_flag | u(1) |
| mps_sparsification_flag | u(1) |
| mps_pruning_flag | u(1) |
| mps_unification_flag | u(1) |
| mps_decomposition_performance_map_flag | u(1) |
| mps_quantization_method_flags | u(3) |
| mps_NN_enum_id | st(v) or any type |
| mps_NN_default_params_flag | u(1) |
| mps_NN_param_enum_present_flag | u(1) |

-continued

| nnr_model_parameter_set_payload( ) { | Descriptor |
|---|---|
| reserved | u(6) |
| if (!mps_NN_default_params_flag) { | |
|   if(mps_NN_param_enum_present_flag) { | |
|     NN_params_enum_id | st(v) or any type |
|   } else { | |
|     NN_params( ) | st(v) or any type |
|   } | |
| } | |
| if((mps_quantization_method_flags & NNR_QSU) == NNR_QSU \|\| (mps_quantization_method_flags & NNR_QCB) == NNR_QCB) { | |
|   mps_qp_density | u(3) |
|   mps_quantization_parameter | i(13) |
| } | |
| if(mps_sparsification_flag == 1) | |
|   sparsification_performance_map( ) | |
| if(mps_pruning_flag == 1) | |
|   pruning_performance_map( ) | |
| if(mps_unification_flag == 1) | |
|   unification_performance_map( ) | |
| if(mps_decomposition_performance_map_flag == 1) | |
|   decomposition_performance_map( ) | |
| } | |

In another embodiment, in the nn_data( ) of an APS, the following may be signaled

| nn_data( ) { | Descriptor |
|---|---|
| mps_NN_enum_id | st(v) or any type |
| mps_NN_default_params_flag | u(1) |
| mps_NN_param_enum_present_flag | u(1) |
| reserved | u(6) |
| if (!mps_NN_default_params_flag) { | |
|   if(mps_NN_param_enum_present_flag) { | |
|     NN_params_enum_id | st(v) or any type |
|   } else { | |
|     NN_params( ) | st(v) or any type |
|   } | |
| } | |

When nn_data( ) is parsed, NN related enumerations and parameters may be obtained by the parser and then passed on to the necessary process which will initialize and use the NN in decoding/post-pre processing operations.

Some Additional Embodiments are Described Below:

While embodiments were described in relation to video bitstreams, they generally apply to any media types with SEI or alike. e.g. MPEG Visual Volumetric Video-based Coding (V3C, ISO/IEC 23090-5) has an SEI mechanism.

sei_container( ) may be utilized in audio encoded bitstreams such as MPEG audio bitstreams as an extension such as syntax elements that contain user data and/or as profile indicators which indicate the presence of such data in the bitstream. There may be multiple such sei_containers per each audio channel.

In an embodiment, enumerating the topology may be applied as follows:

The decoder-side device may already have a set of N possible topologies of neural networks. Topology here refers to the structure or architecture of the neural networks, such as number of layers, types of layers, number of computational units per layer, number of convolutional channels per layer, hyper-parameters of the layers, and the like. Topology information usually does not include the values of the weights and of other learnable parameters. Computational units may be referred to as artificial neurons. Artificial neurons are computation units that form a fully-connected layer.

For each topology, the decoder-side device may have the associated weights and other learnable parameters. These weights may be shared among two or more different topologies.

In one embodiment, the encoder-side device may signal information about which topology is to be used. The decoder-side device would then use that topology and the associated weights.

In one embodiment, the signaled information may be a unique identifier (ID). The encoder-side device and the decoder-side devices are assumed to have a look-up table which associates the ID to the corresponding topology. The ID may be signaled within the NNR_TPL unit of the high-level syntax of MPEG-NNR standard. The MPEG-NNR bitstream would be signaled within filter_sei_message( ).

In another embodiment, the signaled information may be a full representation of a neural network topology. For example, it may be a subset of a topology already present at decoder side (e.g., a subset of layers), and only weights associated to the subset of the topology are selected at decoder side.

It is remarked that the design is not limited to neural network based filters, but is also applicable to any types of filtering, including for example adaptive loop filtering, which may be identical or similar to that specified in H.266/VVC. In an embodiment, sei_container( ) may contain any type of filter_sei_message( ), for example, filter_sei_message( ) does not necessarily specify a neural network based filter but could specify any filter, such as an adaptive loop filter (ALF), e.g. as specified in H.266/VVC but applying as a post-processing operation (not affecting reconstruction of reference pictures). In an embodiment, different types of sei_container( ) structures are specified, where one or more types may indicate a neural network based filter and another one or more types may indicate other type(s) of filter(s), such as an adaptive loop filter. For example, sei_container( ) may be an SEI message whose payload type indicates which type of a filter is specified by the SEI message.

In an embodiment, a filter is specified or identified in a parameter set, such as an adaptation parameter set. The filter may be for example a neural network based filter or an adaptive loop filter as described in other embodiments. Furthermore, sei_container( ) contains a filter_sei_message( ) or alike that identifies the parameter set that contains or identifies the filter. sei_container may contain other structures, such as purpose_sei_message( ) as described in other embodiments. Thus, this embodiment enables the signaling of the filter in a parameter set and associating the signaled filter to a purpose in sei_container( ), which may for example be contained in an SEI NAL unit. For example, an ALF filter may be specified using an ALF APS and referenced by sei_container( ) for filtering taking place as a post-processing operation. It may be more efficient in byte count to contain NNR bitstreams in parameter sets than SEI messages due to the way of expressing payloadSize of an SEI message.

In an embodiment, sei_container( ) and/or the contained SEI messages may indicate which contained SEI messages are mandatory to be processed in order to perform the filtering. Some contained SEI messages may be marked optional, when they provide information or describe filtering steps of minor importance.

Figure 14:
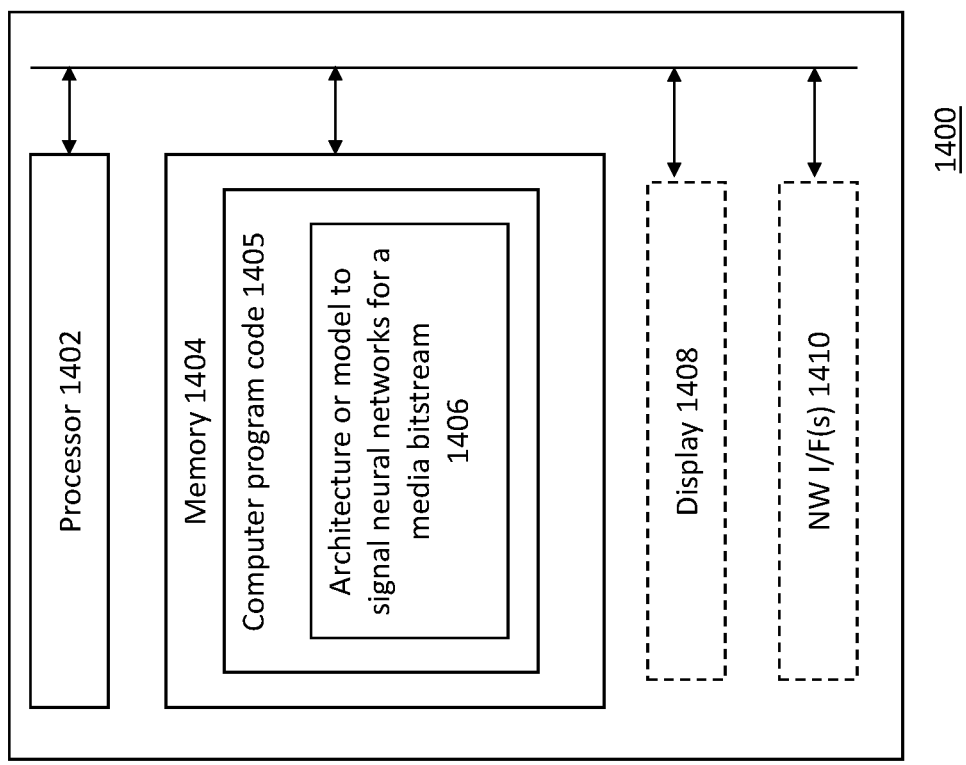
FIG. 14 is an example apparatus configured to signal neural networks within a media bitstream, in accordance with an embodiment.

FIG. 14 is an example apparatus 1400, which may be implemented in hardware, configured to signal neural networks within a media bitstream, based on the examples described herein. Some example of the apparatus 1400 include, but are not limited to, apparatus 50, client device 604, and apparatus 700. The apparatus 1400 comprises a processor 1402, at least one non-transitory memory 1404 including computer program code 1405, wherein the at least one memory 1404 and the computer program code 1405 are configured to, with the at least one processor 1402, cause the apparatus 1400 to signal neural networks within a media bitstream 1406 based on the examples described herein. The apparatus 1400 optionally includes a display 1408 that may be used to display content during rendering. The apparatus 1400 optionally includes one or more network (NW) interfaces (I/F(s)) 1410. The NW I/F(s) 1410 may be wired and/or wireless and communicate over the Internet/other network(s) via any communication technique. The NW I/F(s) 1410 may comprise one or more transmitters and one or more receivers.

Figure 15:
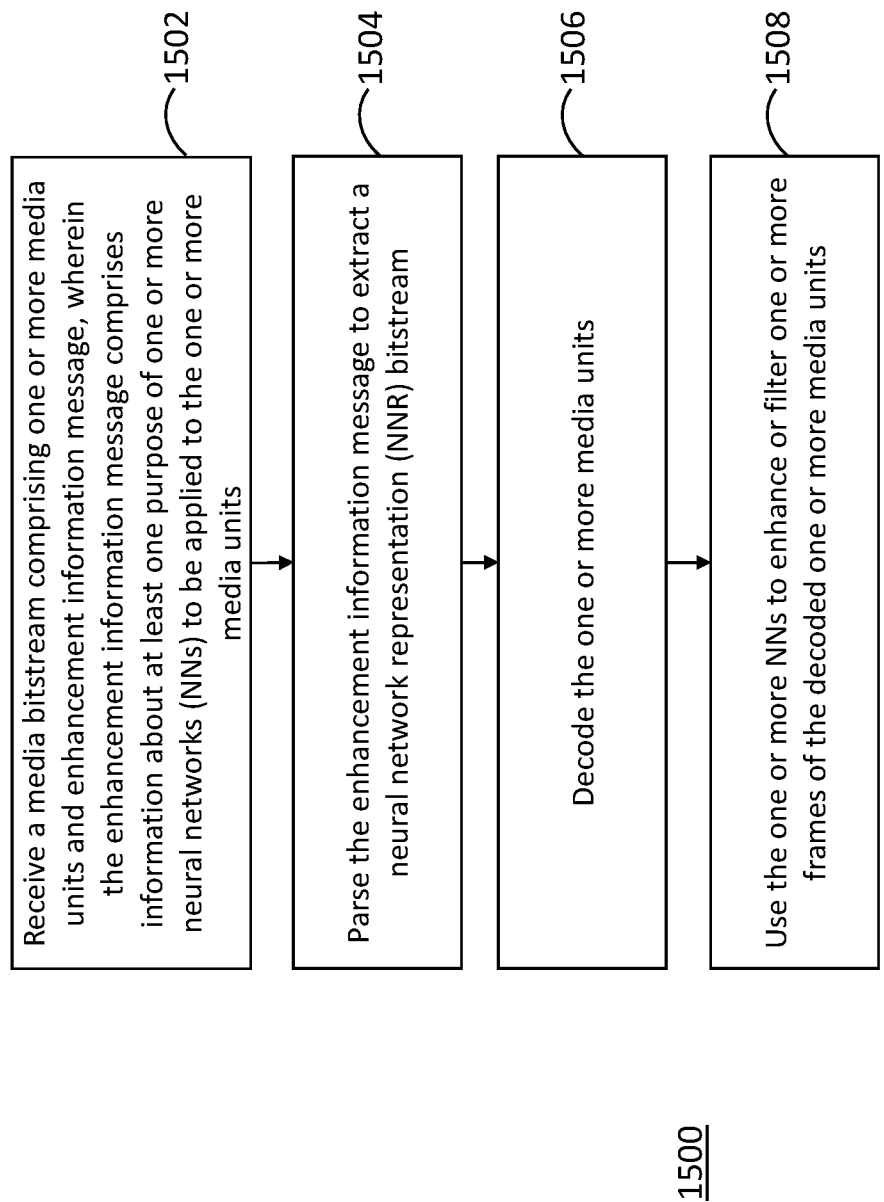
FIG. 15 is an example method to signal neural networks within a media bitstream, in accordance with an example embodiment.

FIG. 15 is an example method 1500 to signal neural network within a media bitstream, in accordance with an embodiment. At 1502, the method includes receiving a media bitstream comprising one or more media units and enhancement information message, where the enhancement information message comprises information about at least one purpose of one or more neural networks (NNs) to be applied to the one or more media units. An example of the enhancement information message include NN supplemental enhancement information message. In an embodiment, the enhancement information message is included in an enhancement information container. An example of the one or more media units include one or more video units, where an example of the one or more video units include one or more network abstraction layer video units.

At 1504, the method includes parsing the enhancement information message to extract a neural network representation (NNR) bitstream. An example of NNR bitstream includes MPEG-NNR bitstream. At 1506, the method includes decoding the one or more media units. At 1508, the method includes using the one or more NNs to enhance or filter one or more frames of the decoded one or more media units. In an embodiment, parsing the enhancement information message, decoding the NNR bitstream, and decoding the one or more media units are performed simultaneously. In an example, the apparatus 1400 can be used to implement the method 1500.

Figure 16:
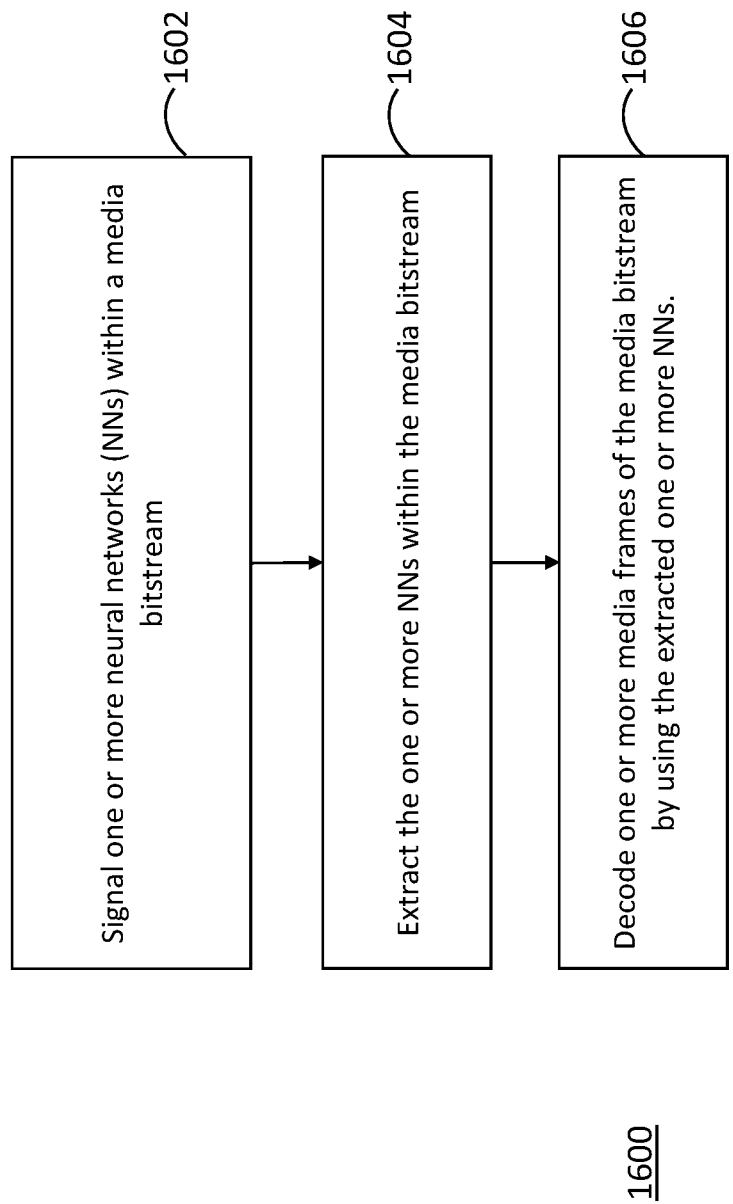
FIG. 16 is another example method to signal neural networks within a media bitstream, in accordance with another example embodiment.

FIG. 16 is an example method 1600 to signal neural network within a media bitstream, in accordance with another embodiment. At 1602, the method includes signaling one or more neural networks (NNs) within a media bitstream. At 1604, the method includes extracting the one or more NNs within the media bitstream. At 1606, the method includes decoding one or more media frames of the media bitstream by using the extracted one or more NNs. In an example, the apparatus 1400 can be used to implement the method 1600.

Figure 17:
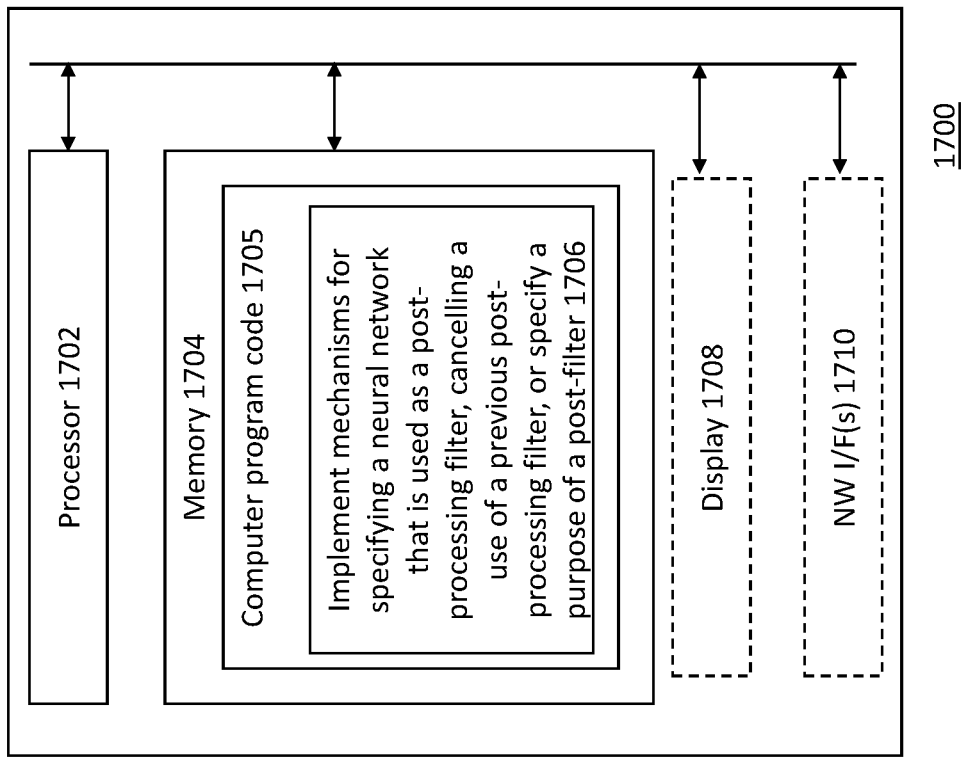
FIG. 17 is an example apparatus configured to implement mechanisms for specifying a neural network that is used as a post-processing filter, cancelling a use of a previous post-processing filter, or specify a purpose of a post-filter, in accordance with an embodiment.

FIG. 17 is an example apparatus configured to implement mechanisms for specifying a neural network that is used as a post-processing filter, cancelling a use of a previous post-processing filter, or specify a purpose of a post-filter, in accordance with an embodiment. Some example of the apparatus 1700 include, but are not limited to, apparatus 50, client device 604, and apparatus 700. The apparatus 1700 comprises a processor 1702, at least one non-transitory memory 1704 including computer program code 1705, wherein the at least one memory 1704 and the computer program code 1705 are configured to, with the at least one processor 1702, cause the apparatus 1700 to implement mechanisms for specifying a neural network that is used as a post-processing filter, cancelling a use of a previous post-processing filter, or specify a purpose of a post-filter 1706 based on the examples described herein. The apparatus 1700 optionally includes a display 1708 that may be used to display content during rendering. The apparatus 1700 optionally includes one or more network (NW) interfaces (I/F(s)) 1710. The NW I/F(s) 1710 may be wired and/or wireless and communicate over the Internet/other network(s) via any communication technique. The NW I/F(s) 1710 may comprise one or more transmitters and one or more receivers.

Figure 18:
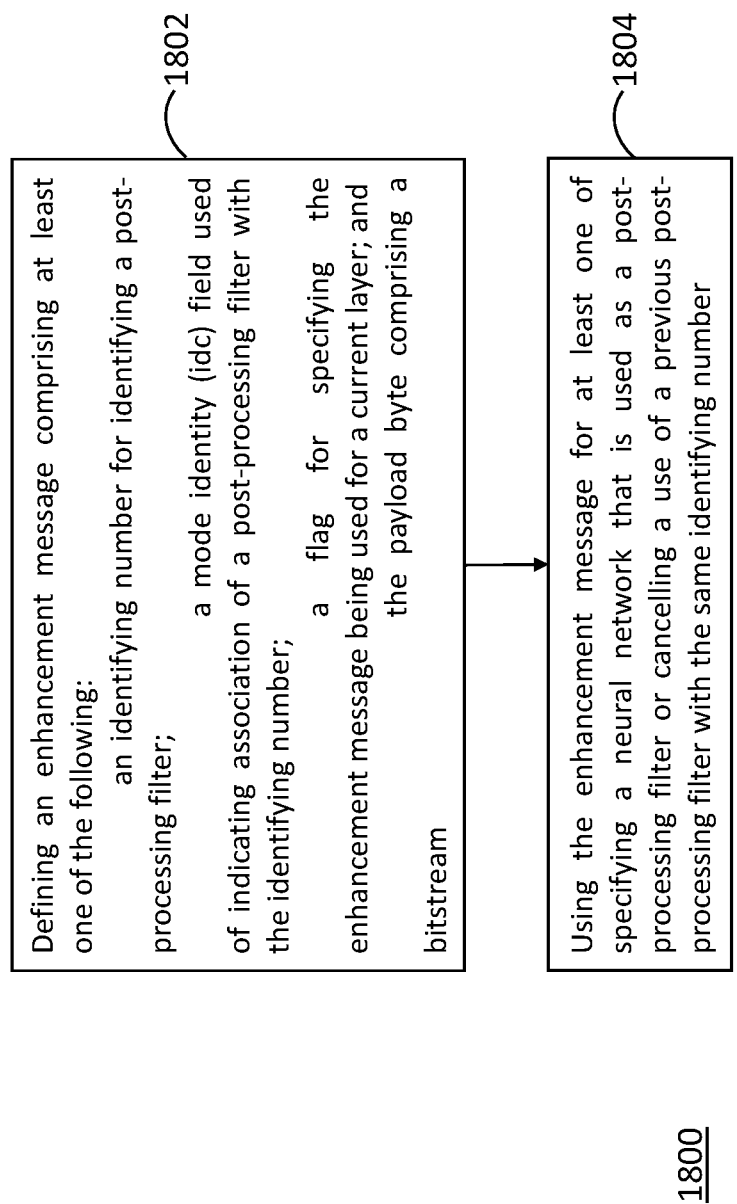
FIG. 18 is an example method for specifying a neural network that is used as a post-processing filter or cancelling a use of a previous post-processing filter, in accordance with an embodiment.

FIG. 18 is an example method 1800 for specifying a neural network that is used as a post-processing filter or cancelling a use of a previous post-processing filter, in accordance with an embodiment. At 1802, the method 1800 includes defining an enhancement message comprising at least one of the following: an identifying number for identifying a post-processing filter; a mode identity (idc) field used of indicating association of a post-processing filter with the identifying number; a flag for specifying the enhancement message being used for a current layer; and the payload byte comprising a bitstream. An example, of the enhancement message includes, but is not limited to a neural network representation (NNR) post-filter supplemental enhancement information (SEI) message.

The mode idc field used of indicating association of a post-processing filter with the identifying number may be indicative of one or more of the following: i) turn off or stop the persistence of a post-processing filter; ii) turn on a post-processing filter identified by a given Uniform Resource Identifier (URI); iii) turn on a post-processing filter represented by a neural network bitstream (e.g. ISO/IEC 15938-17 bitstream) contained in this enhancement message; and/or iv) update a post-processing filter with a neural network bitstream (e.g. ISO/IEC 15938-17 bitstream) contained in this enhancement message.

At 1804, the method 1800 using the enhancement message for at least one of specifying a neural network that is used as a post-processing filter or cancelling a use of a previous post-processing filter with the same identifying number. In an example, the apparatus 1700 may be used to implement the method 1800.

Figure 19:
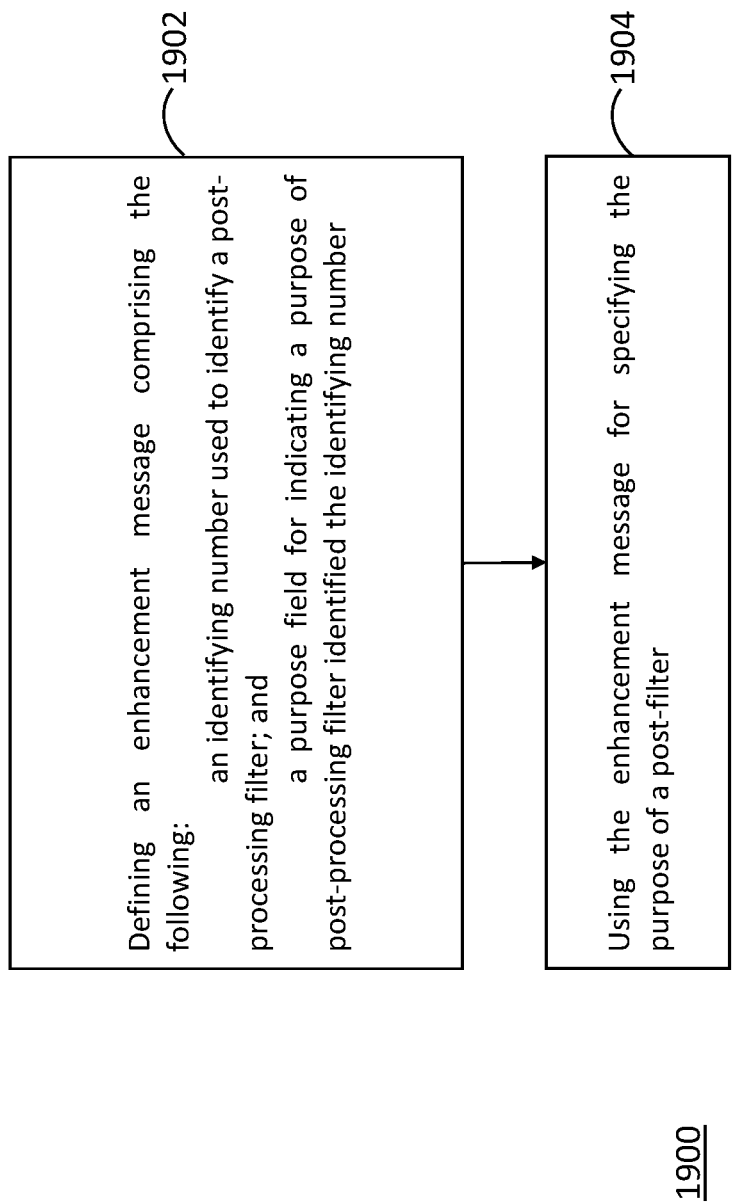
FIG. 19. is an example method for specifying a purpose of a post-filter, in accordance with an embodiment.

FIG. 19. is an example method 1900 for specifying a purpose of a post-filter, in accordance with an embodiment. At 1902, the method 1900 includes defining an enhancement message comprising the following: an identifying number used to identify a post-processing filter; and a purpose field for indicating a purpose of post-processing filter identified the identifying number. An example, of the enhancement message includes, but is not limited to a neural network representation (NNR) post-filter supplemental enhancement information (SEI) message.

At 1902, the method 1900 includes using the enhancement message for specifying the purpose of a post-filter. Some examples of the purpose include, but are not limited to, visual quality improvement of a media item or increase the width or height of cropped decoded output media item. In an example, the apparatus 1700 may be used to implement the method 1900.

Figure 20:
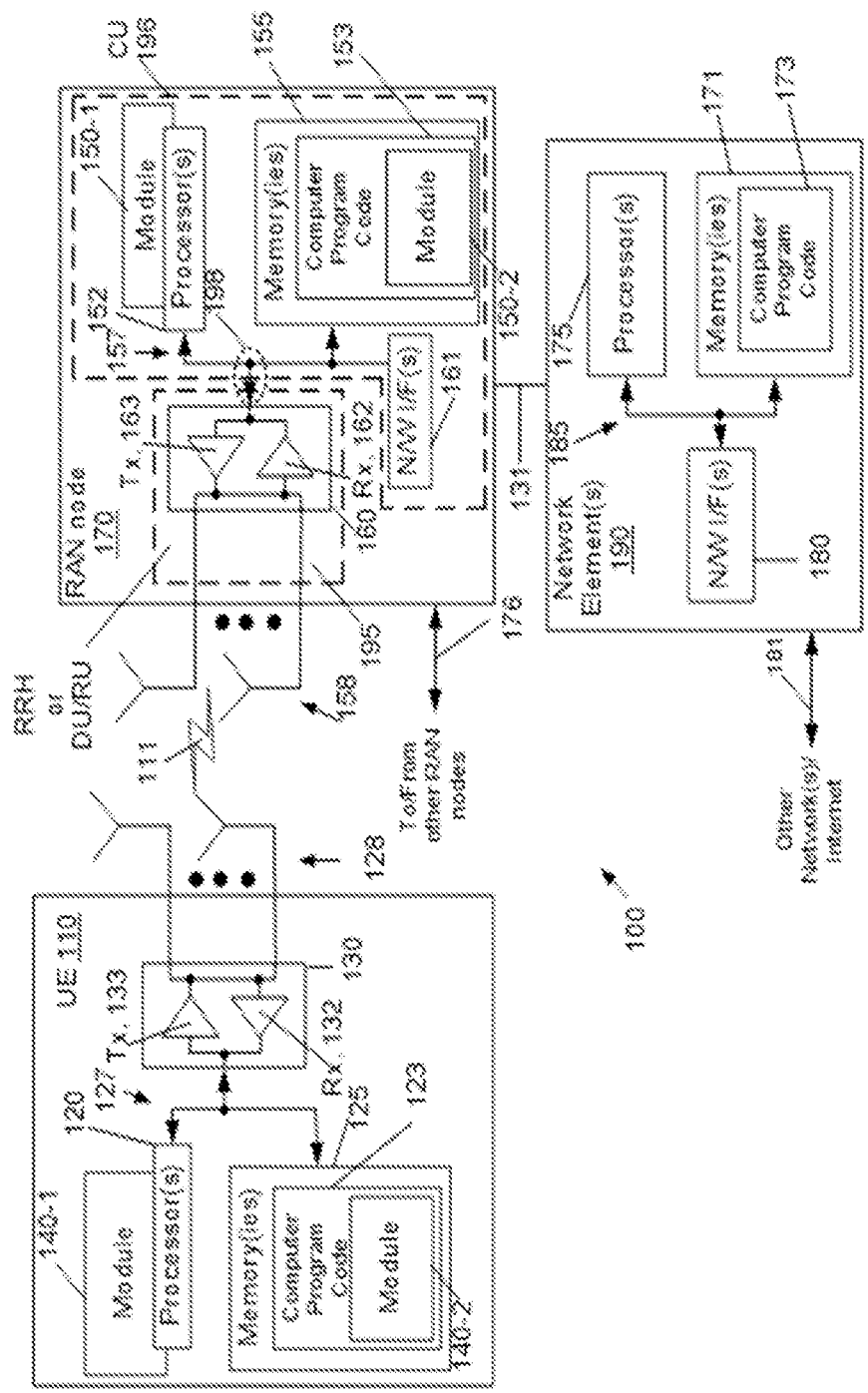
FIG. 20 is a block diagram of one possible and non-limiting system in which the example embodiments may be practiced.

Turning to FIG. 20, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to signal neural networks within a media bitstream of neural networks based on the examples described herein. Computer program code 173 may also be configured to signal neural networks within a media bitstream based on the examples described herein.

As described above, FIGS. 15 and 16 include flowcharts of an apparatus (e.g. 50, 100, 604, 700, or 1400), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 704, or 1404) of an apparatus employing an embodiment of the present invention and executed by processing circuitry (e.g. 56, 120, 702 or 1402) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 15 and 16. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with reference to an SEI message or an SEI NAL unit. It needs to be understood, however, that embodiments can be similarly realized with any similar structures or data units. Where example embodiments have been described with SEI messages contained in a structure, any independently parsable structures could likewise be used in embodiments. Specific SEI NAL unit and a SEI message syntax structures have been presented in example embodiments, but it needs to be understood that embodiments generally apply to any syntax structures with a similar intent as SEI NAL units and/or SEI messages.

In the above, some embodiments have been described in relation to a particular type of a parameter set (namely adaptation parameter set). It needs to be understood, however, that embodiments could be realized with any type of parameter set or other syntax structure in the bitstream.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
creating one or more prefix indications in or along a bitstream;
including, in the one or more prefix indications, an initial part of an information message, wherein the information message describes one or more post-filtering operations or related information, and wherein the initial part describes one or more post-filter properties;
using the one or more prefix indications to declare the one or more post-filter properties of the bitstream so as to enable selection of the bitstream to be received or decoded;
making the one or more prefix indications accessible through a media description describing the bitstream, wherein the one or more prefix indications are contained in at least one of the following:
one or more media parameters in the media description; or
one or more syntax elements or one or more syntax structures in a file encapsulating the bitstream, wherein the file is accessible via the media description.

2. The method according to claim 1, wherein the one or more post-filter properties comprise one or more of the following:
filtering purpose;
one or more complexity measures of executing the one or more post-filtering operations; or
an identification of or a reference to a post-filter neural network.

3. The method according to claim 1, wherein the one or more prefix indications comprise one or more supplemental enhancement information (SEI) prefix indications, the information message comprises a SEI information message, and the bitstream comprises a video bitstream.

4. A method comprising:
receiving one or more prefix indications for a bitstream;
parsing, from the one or more prefix indications, an initial part of an information message, wherein the information message describes one or more post-filtering operations or related information, and wherein the initial part describes one or more post-filter properties, wherein the one or more prefix indications declare the one or more post-filter properties of the bitstream so as to enable selection of the bitstream to be received or decoded;
parsing through a media description describing the bitstream to access the one or more prefix indications, wherein the one or more prefix indications are contained in at least one of the following:
one or more media parameters in the media description; or
one or more syntax elements or one or more syntax structures in a file encapsulating the bitstream, wherein the file is accessible via the media description;
determining, based on the declared one or more post-filter properties, one or more of the following:
whether to fetch the bitstream;
whether to fetch the information message; or
whether to fetch a neural network referenced by the one or more post-filter properties.

5. The method according to claim 4, wherein the one or more post-filter properties comprise one or more of the following:
   a filtering purpose;
   one or more complexity measures of executing the one or more post-filtering operations; or
   an identification of or a reference to a post-filter neural network.

6. The method according to claim 4, wherein the one or more prefix indications comprise one or more supplemental enhancement information (SEI) prefix indications, the information message comprises a SEI information message, and the bitstream comprises a video bitstream.

7. An apparatus comprising at least one processor; and at least one non-transitory memory storing instructions that, when executed by the at least one processor, cause the apparatus at least to perform:
   creating one or more prefix indications in or along a bitstream;
   including, in the one or more prefix indications, an initial part of an information message, wherein the information message describes one or more post-filtering operations or related information, and wherein the initial part describes one or more post-filter properties;
   using the one or more prefix indications to declare the one or more post-filter properties of the bitstream so as to enable selection of the bitstream to be received or decoded;
   making the one or more prefix indications accessible through a media description describing the bitstream, wherein the one or more prefix indications are contained in at least one of the following:
      one or more media parameters in the media description; or
      one or more syntax elements or one or more syntax structures in a file encapsulating the bitstream, wherein the file is accessible via the media description.

8. The apparatus according to claim 7, wherein the one or more post-filter properties comprise one or more of the following:
   filtering purpose;
   one or more complexity measures of executing the one or more post-filtering operations; or
   an identification of or a reference to a post-filter neural network.

9. The apparatus according to claim 7, wherein the one or more prefix indications comprise one or more supplemental enhancement information (SEI) prefix indications, the information message comprises a SEI information message, and the bitstream comprises a video bitstream.

10. An apparatus comprising at least one processor; and at least one non-transitory memory storing instructions that, with when executed by the at least one processor, cause the apparatus at least to perform:
    receiving one or more prefix indications for a bitstream;
    parsing, from the one or more prefix indications, an initial part of an information message, wherein the information message describes one or more post-filtering operations or related information, and wherein the initial part describes one or more post-filter properties, wherein the one or more prefix indications declare the one or more post-filter properties of the bitstream so as to enable selection of the bitstream to be received or decoded;
    parsing through a media description describing the bitstream to access the one or more prefix indications, wherein the one or more prefix indications are contained in at least one of the following:
       one or more media parameters in the media description; or
       one or more syntax elements or one or more syntax structures in a file encapsulating the bitstream, wherein the file is accessible via the media description;
    determining, based on the declared one or more post-filter properties, one or more of the following:
       whether to fetch the bitstream;
       whether to fetch the information message; or, or
       whether to fetch a neural network referenced by the one or more post-filter properties.

11. The apparatus according to claim 10, wherein the one or more post-filter properties comprise one or more of the following:
    a filtering purpose;
    one or more complexity measures of executing the one or more post-filtering operations; or
    an identification of or a reference to a post-filter neural network.

12. The apparatus according to claim 10, wherein the one or more prefix indications comprise one or more supplemental enhancement information (SEI) prefix indications, the information message comprises a SEI information message, and the bitstream comprises a video bitstream.

13. The method according to claim 1, wherein the one or more prefix indications are contained at least in the one or more media parameters in the media description.

14. The method according to claim 1, wherein the one or more prefix indications are contained at least in the one or more syntax elements or the syntax structures in the file encapsulating the bitstream, wherein the file is accessible via the media description.

15. The method according to claim 4, wherein the one or more prefix indications are contained at least in the one or more media parameters in the media description.

16. The method according to claim 4, wherein the one or more prefix indications are contained at least in the one or more syntax elements or the syntax structures in the file encapsulating the bitstream, wherein the file is accessible via the media description.

17. The apparatus according to claim 7, wherein the one or more prefix indications are contained at least in the one or more media parameters in the media description.

18. The apparatus according to claim 7, wherein the one or more prefix indications are contained at least in the one or more syntax elements or the syntax structures in the file encapsulating the bitstream, wherein the file is accessible via the media description.

19. The apparatus according to claim 10, wherein the one or more prefix indications are contained at least in the one or more media parameters in the media description.

20. The apparatus according to claim 10, wherein the one or more prefix indications are contained at least in the one or more syntax elements or the syntax structures in the file encapsulating the bitstream, wherein the file is accessible via the media description.

* * * * *